US008446853B2

(12) United States Patent
Umeda et al.

(10) Patent No.: US 8,446,853 B2
(45) Date of Patent: May 21, 2013

(54) COMMUNICATION CONTROL APPARATUS, MOBILE TERMINAL APPARATUS, AND RADIO COMMUNICATION METHOD

(75) Inventors: Masataka Umeda, Kawasaki (JP); Yoshiyuki Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 12/828,285

(22) Filed: Jun. 30, 2010

(65) Prior Publication Data

US 2011/0019606 A1  Jan. 27, 2011

(30) Foreign Application Priority Data

Jul. 27, 2009 (JP) ................................. 2009-174313

(51) Int. Cl.
*H04B 7/14* (2006.01)

(52) U.S. Cl.
USPC ................ 370/315; 370/311; 370/328; 455/9

(58) Field of Classification Search
None
See application file for complete search history.

(56) References Cited

U.S. PATENT DOCUMENTS

| 7,184,703 | B1 * | 2/2007 | Naden et al. | 455/10 |
|---|---|---|---|---|
| 7,853,203 | B2 * | 12/2010 | Kang et al. | 455/11.1 |
| 7,907,540 | B2 * | 3/2011 | Li et al. | 370/252 |
| 8,078,159 | B2 * | 12/2011 | Kang et al. | 455/425 |
| 8,165,073 | B2 * | 4/2012 | Wang et al. | 370/329 |
| 8,243,641 | B2 * | 8/2012 | Kim | 370/311 |
| 8,265,550 | B2 * | 9/2012 | Aaron | 455/13.1 |
| 2002/0187746 | A1 * | 12/2002 | Cheng et al. | 455/11.1 |
| 2008/0219214 | A1 * | 9/2008 | Chen et al. | 370/331 |
| 2009/0233544 | A1 * | 9/2009 | Oyman et al. | 455/7 |
| 2009/0239466 | A1 * | 9/2009 | Saitou et al. | 455/11.1 |
| 2010/0182916 | A1 * | 7/2010 | Drewes et al. | 370/252 |

FOREIGN PATENT DOCUMENTS

| JP | 2001-237764 A | 8/2001 |
|---|---|---|
| JP | 2003-229892 | 8/2003 |
| JP | 2007-194821 A | 8/2007 |
| JP | 2007-281853 | 10/2007 |

OTHER PUBLICATIONS

"Institute of Electrical and Electronics Engineers 802.16j standard" (the IEEE), Jun. 12, 2009.
Japanese Office Action mailed Mar. 12, 2013 for corresponding Japanese Application No. 2009-174313, with partial English-language translation.

* cited by examiner

*Primary Examiner* — Michael J Moore, Jr.
(74) *Attorney, Agent, or Firm* — Fujitsu Patent Center

(57) ABSTRACT

Each mobile terminal apparatus measures receiving power or receiving quality of a signal received from a radio communication apparatus. If a plurality of mobile terminal apparatuses in which the receiving power or the receiving quality is lower than or equal to a determined threshold are detected, then a communication control apparatus selects a mobile terminal apparatus made to function as a relay station from the plurality of mobile terminal apparatuses detected on the basis of a result of measuring the receiving power or the receiving quality. The mobile terminal apparatus selected relays communication between the radio communication apparatus and a mobile terminal apparatus which does not function as a relay station.

13 Claims, 16 Drawing Sheets

222 RELAY STATION TABLE

| RS_ID | BAND | PATH |
|---|---|---|
| RS#1 | BAND #1 | RS#4-BS#1-RS#1 |
| RS#2 | BAND #2 | RS#4-RS#2 |
| RS#3 | BAND #1 | RS#4-RS#2-RS#3 |
| RS#4 | BAND #3 | — |

FIG. 5

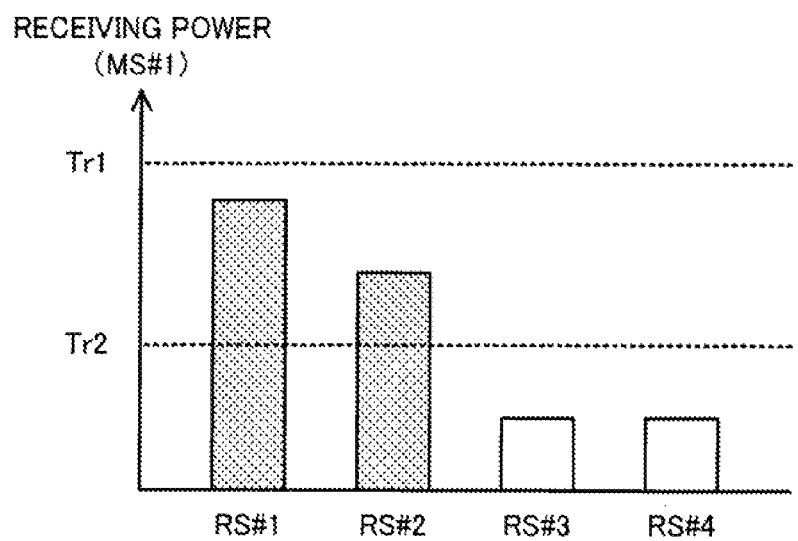
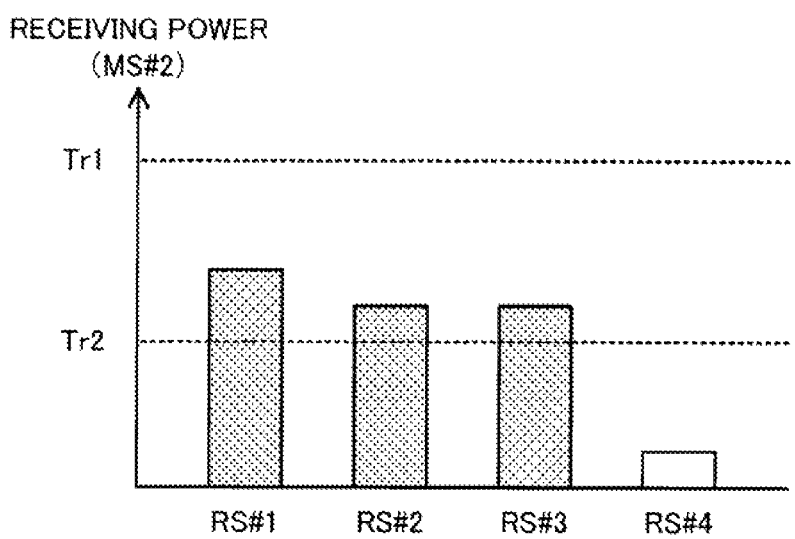
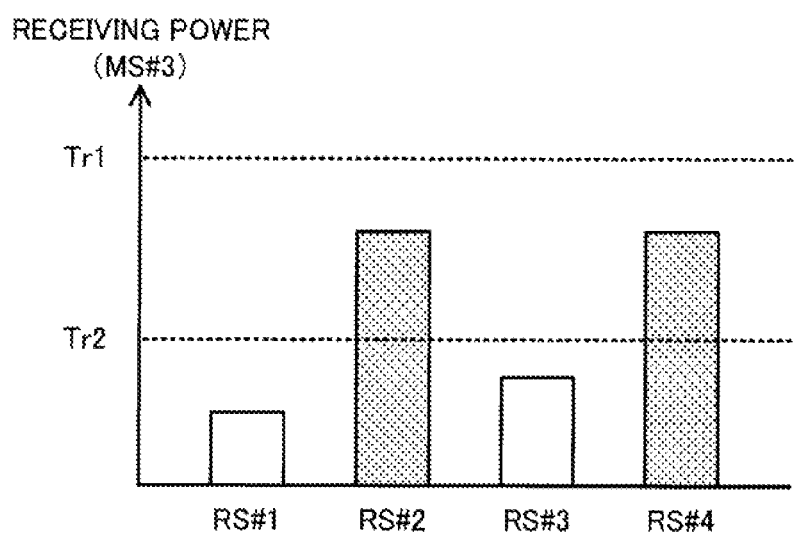
FIG. 7

223 ADJACENCY RELATIONSHIP TABLE

| MS_ID | ADJACENT BS OR RS | NUMBER OF ADJACENT BSS AND RSS | ESTIMATED AREA |
|---|---|---|---|
| MS#1 | RS#1, RS#2 | 2 | A |
| MS#2 | RS#1, RS#2, RS#3 | 3 | A |
| MS#3 | RS#2, RS#4 | 2 | B |

FIG. 9

224 INTERFERENCE AMOUNT TABLE

| BAND ID | RS_ID | RECEIVING POWER | | | INTERFERENCE AMOUNT |
|---|---|---|---|---|---|
| | | MS#1 | MS#2 | MS#3 | AREA A |
| BAND #1 | RS#1, RS#3 | 60 | 50 | 20 | 110 |
| BAND #2 | RS#2 | 50 | 30 | 50 | 80 |
| BAND #3 | RS#4 | 20 | 10 | 50 | 30 |

FIG. 10

COMMUNICATION CONTROL APPARATUS, MOBILE TERMINAL APPARATUS, AND RADIO COMMUNICATION METHOD

CROSS-REFERENCE TO RELATED APPLICATION(S)

This application is based upon and claims the benefit of priority of the prior Japanese Patent Application No. 2009-174313, filed on Jul. 27, 2009, the entire contents of which are incorporated herein by reference.

FIELD

The embodiments discussed herein are related to a communication control apparatus, a mobile terminal apparatus, and a radio communication method.

BACKGROUND

At present, mobile communication systems such as portable telephone systems and radio LANs (Local Area Networks) are widely used. With cellular mobile communication systems, a mobile terminal apparatus is connected to a base station apparatus the coverage area of which includes its present position and can perform radio communication. With cellular mobile communication systems, one possible method for expanding a coverage area or improving communication quality is to install base station apparatuses and base station sending-receiving antennas in many places.

Another possible method for expanding a coverage area or improving communication quality is to use multihop relay communication. For example, a multihop relay communication technique is discussed in the IEEE (Institute of Electrical and Electronics Engineers) 802.16j standard. With the multihop relay communication, a relay station apparatus intervenes between a base station apparatus and a mobile terminal apparatus and can relay radio communication. The mobile terminal apparatus should be connected to any base station apparatus or relay station apparatus. The relay station apparatus may be a fixed radio communication apparatus or a mobile radio communication apparatus.

With the multihop relay communication, the following technique is known. Each mobile station can be connected to other mobile stations. One of mobile stations for which a hop count up to a base station is the lowest is selected as an upper station. By doing so, a multihop relay communication network is built autonomously. In addition, another technique is known. That is to say, after communication is begun, a mobile station at a receiving end informs a mobile station at a sending end about an interference amount in each time slot and the mobile station at the sending end transmits data by the use of a time slot in which an interference amount is small.

Japanese Laid-open Patent Publication No. 2001-237764
Japanese Laid-open Patent Publication No. 2007-194821

With the above method of building a multihop relay communication network, however, many radio communication apparatus each of which functions as a relay station may be set. This may lead to a fall in the efficiency of the operation of an entire mobile communication system. If there are many relay station apparatus, radio frequency interference between relay station apparatus, for example, is problematic. Furthermore, compared with a radio communication apparatus which does not function as a relay station, a radio communication apparatus which functions as a relay station has a disadvantage in power consumption. Accordingly, it is not desirable that excessively many radio communication apparatus function as relay stations.

SUMMARY

According to an aspect of the invention, a communication control apparatus used in a mobile communication system including a radio communication apparatus which functions as a base station or a relay station and a plurality of mobile terminal apparatuses connected to the radio communication apparatus for performing radio communication includes a receiving section which acquires, from a mobile terminal apparatus in which receiving power or receiving quality of a signal received from the radio communication apparatus is lower than or equal to a determined threshold, information indicative of the receiving power or the receiving quality measured by the mobile terminal apparatus and a control section which designates, in the case of more than one mobile terminal apparatus in which the receiving power or the receiving quality is lower than or equal to the determined threshold being detected, a mobile terminal apparatus made to function as a relay station for relaying communication between the radio communication apparatus and a mobile terminal apparatus which does not function as a relay station from the more than one mobile terminal apparatus detected on the basis of the acquired information indicative of the receiving power or the receiving quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 5 is an example data structure of a relay station table;

FIG. 7 is example results of measuring receiving power;

FIG. 9 is an example data structure of an adjacency relationship table;

FIG. 10 is an example data structure of an interference amount table;

DESCRIPTION OF EMBODIMENT(S)

Figure 1:
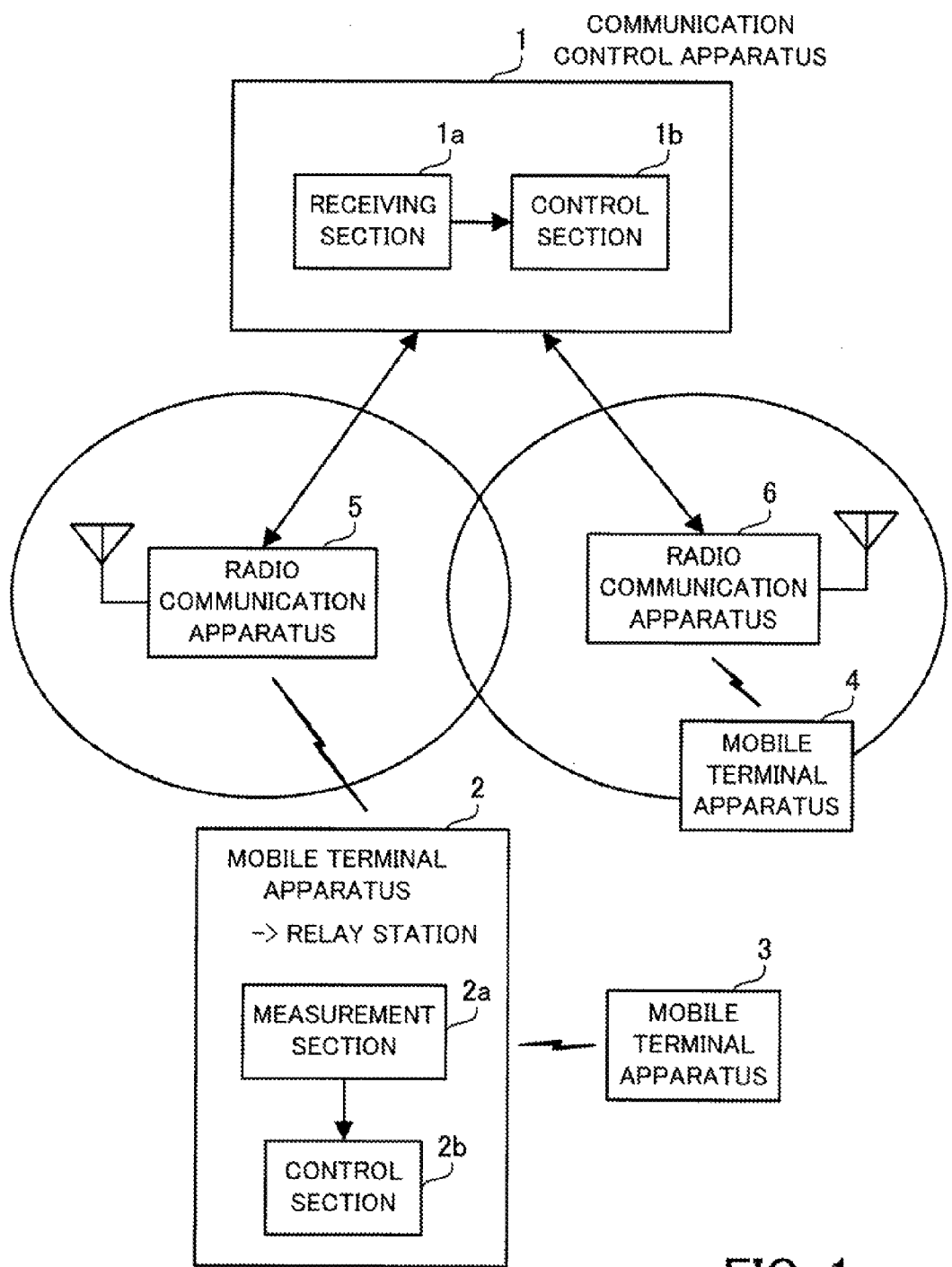
FIG. 1 illustrates a mobile communication system according to a first embodiment.

Embodiments will now be described in detail with reference to the accompanying drawings, wherein like reference numerals refer to like elements throughout.

First Embodiment

FIG. 1 illustrates a mobile communication system according to a first embodiment. A mobile communication system illustrated in FIG. 1 includes a communication control apparatus 1, mobile terminal apparatus 2, 3, and 4, and radio communication apparatus 5 and 6.

The communication control apparatus 1 can designate a mobile terminal apparatus which is made to function as a relay station for relaying radio communication. The communication control apparatus 1 can perform wireless or wired communication with the radio communication apparatus 5 or 6. An apparatus selected from among communication apparatus each of which functions as, for example, a base station, a relay station, or an upper station for controlling the base station can be used as the communication control apparatus 1.

In the case of functioning as a terminal station (in the case of not functioning as a relay station), each of the mobile terminal apparatus 2, 3, and 4 is connected to a radio communication apparatus which functions as a base station or a relay station, and performs radio communication. In the case of functioning as a relay station, on the other hand, each of the mobile terminal apparatus 2, 3, and 4 relays radio communication between a radio communication apparatus which functions as a base station or a relay station and a mobile terminal apparatus which functions as a terminal station. The mobile terminal apparatus 2, 3, and 4 can perform radio communication with the radio communication apparatus 5 and 6.

Each of the radio communication apparatus 5 and 6 functions as a base station or a relay station. For example, a fixed radio communication apparatus which functions as a base station, a fixed radio communication apparatus which functions as a relay station, or a mobile terminal apparatus which functions as a relay station can be used as each of the radio communication apparatus 5 and 6. Each of the radio communication apparatus 5 and 6 can perform radio communication with a mobile terminal apparatus which functions as a terminal station. In addition, each of the radio communication apparatus 5 and 6 can set a communication path for relaying radio communication between it and another radio communication apparatus which functions as a relay station.

The communication control apparatus 1 includes a receiving section 1a and a control section 1b.

The receiving section 1a acquires, from mobile terminal apparatus (in this example, the mobile terminal apparatus 2 and 3) in which the receiving power or receiving quality of a signal received from any of the radio communication apparatus 5 and 6 is lower than or equal to a determined threshold Tr1, information indicative of the receiving power or the receiving quality measured by the mobile terminal apparatus. For example, SNR (Signal to Noise Ratio) is used as an index of receiving quality. The information indicative of the receiving power or the receiving quality may include a value indicative of the receiving power or receiving quality of a signal received from each of the radio communication apparatus 5 and 6.

If a plurality of mobile terminal apparatuses in which receiving power or receiving quality is lower than or equal to the determined threshold Tr1 are detected, then the control section 1b designates a mobile terminal apparatus which is made to function as a relay station from among the plurality of mobile terminal apparatus detected (in this example, the mobile terminal apparatus 2 and 3). To select a relay station, the control section 1b refers to information indicative of receiving power or receiving quality in each of the plurality of mobile terminal apparatus which is acquired by the receiving section 1a. The plurality of mobile terminal apparatus are candidate relay stations. The control section 1b then gives a mobile terminal apparatus which is made to function as a relay station (in this example, the mobile terminal apparatus 2) notice to that effect.

The mobile terminal apparatus 2 includes a measurement section 2a and a control section 2b. Each of the mobile terminal apparatus 3 and 4 includes a measurement section and a control section. This is the same with the mobile terminal apparatus 2.

The measurement section 2a measures the receiving power or receiving quality of each signal received from the radio communication apparatus 5 and 6. For example, a known signal, such as a preamble signal, a synchronizing signal, or a pilot signal, included in a radio frame received from each of the radio communication apparatus 5 and 6 can be used for measuring receiving power or receiving quality. For example, SNR is used as an index of receiving quality.

If receiving power or receiving quality measured by the measurement section 2a is lower than or equal to the determined threshold Tr1, then the control section 2b exercises control so as to send the communication control apparatus 1a request to make the mobile terminal apparatus 2 a relay station. The request to make the mobile terminal apparatus 2 a relay station may include information indicative of the receiving power or receiving quality measured by the measurement section 2a. The control section 2b then begins its operation as a relay station on the basis of a response from the communication control apparatus 1 (for example, when the control section 2b receives notice which is indicative that the mobile terminal apparatus 2 is designated as a relay station). For example, the mobile terminal apparatus 2 relays radio communication between the mobile terminal apparatus 3 which is not designated as a relay station and the radio communication apparatus 5. The mobile terminal apparatus 2 or 3 can communicate with the communication control apparatus 1 via the radio communication apparatus 5 or 6.

With the above mobile communication system each of the mobile terminal apparatus 2, 3, and 4 measures the receiving power or receiving quality of signals received from the radio communication apparatus 5 and 6. The communication control apparatus 1 detects the mobile terminal apparatus 2 and 3 in which the receiving power or receiving quality of a signal received from any of the radio communication apparatus 5 and 6 is lower than or equal to the determined threshold Tr1. The communication control apparatus 1 then designates the mobile terminal apparatus 2 which is made to function as a relay station from the mobile terminal apparatus 2 and 3 detected on the basis of the results of measuring the receiving power or the receiving quality.

As a result, the mobile terminal apparatus 3 which is not designated as a relay station is connected to the mobile terminal apparatus 2 which newly functions as a relay station, and can perform radio communication. The mobile terminal apparatus 2 can set a relay path between the mobile terminal apparatus 2 and at least one of the radio communication apparatus 5 and 6 each of which functions as a base station or a relay station, and relay radio communication. In the mobile terminal apparatus 4, on the other hand, the receiving power or receiving quality of a signal received from the radio communication apparatus 6 is higher than the determined threshold Tr1. Accordingly, the mobile terminal apparatus 4 should be connected to the radio communication apparatus 6 for performing radio communication.

As has been described, there may be a plurality of mobile terminal apparatuses in which the receiving power or receiving quality of a signal received from a base station apparatus or an existing relay station apparatus is low. With the mobile communication system according to the first embodiment, a relay station which performs radio communication with the base station apparatus or the existing relay station apparatus on behalf of the plurality of mobile terminal apparatus is designated from them. As a result, a mobile terminal apparatus which is made to function as a relay station is selected properly and an efficient relay communication network can be built. For example, an excessive increase in the number of mobile terminal apparatus each of which functions as a relay station can be checked and radio frequency interference between relay station apparatus can be controlled. In addition, it is easy to reduce the power consumption of a mobile terminal apparatus which does not function as a relay station.

The control section 1b of the communication control apparatus 1 may classify a plurality of mobile terminal apparatuses in which measured receiving power or receiving quality is lower than or equal to the threshold Tr1 into one or more groups according to signal receiving state and designate a relay station in each group. For example, the control section 1b may determine that a plurality of mobile terminal apparatuses similar in state in which they receive signals from the radio communication apparatus 5 and 6 (similar in the receiving power or receiving quality of signals received from the radio communication apparatus 5 and 6) form a group of mobile terminal apparatus adjacent to one another, and classify the plurality of mobile terminal apparatuses into the same group. Furthermore, when the control section 1b makes the above classification, the control section 1b may refer to information indicative of an adjacency relationship between the radio communication apparatus 5 and 6 (for example, information indicative of a relay path). By doing so, a plurality of mobile terminal apparatuses adjacent to one another can be grouped properly and a relay station can be set according to group.

In addition, the control section 1b of the communication control apparatus 1 may designate a frequency band used by the mobile terminal apparatus 2 from a plurality of frequency bands which can be used for relaying radio communication. For example, the control section 1b may total receiving power or receiving quality measured by the mobile terminal apparatus 2 and 3 in each of the plurality of frequency bands and designate a frequency band in which the total of the receiving power or receiving quality is the smallest as the frequency band used by the mobile terminal apparatus 2. By doing so, radio frequency interference between the mobile terminal apparatus 2 as a new relay station and the radio communication apparatus 5 or 6 as a base station or an existing relay station can be controlled.

Moreover, the control section 1b of the communication control apparatus 1 may designate one of the mobile terminal apparatus 2 and 3 as candidate relay stations which detects a larger number of signals the receiving power or receiving quality of which is higher than a determined threshold Tr2 (Tr1>Tr2) as a relay station. For example, it is assumed that the receiving power or receiving quality of signals which the mobile terminal apparatus 2 receives from the radio communication apparatus 5 and 6 is higher than the threshold Tr2 and that the receiving power or receiving quality of signals which the mobile terminal apparatus 3 receives only from the radio communication apparatus 6 is higher than the threshold Tr2. In this case, the control section 1b designates the mobile terminal apparatus 2 as a relay station. By doing so, many paths for relaying radio communication can be secured and the stability of radio communication can be improved.

In addition, the control section 1b of the communication control apparatus 1 may previously designate a frequency band to be used by a new relay station apparatus and designate one of the mobile terminal apparatus 2 and 3 as candidate relay stations in which receiving power or receiving quality is lower in the designated frequency band as a relay station. For example, the control section 1b determines that of frequency bands #1, #2, and #3 the frequency band #2 is to be used, and designates the mobile terminal apparatus 2 as a relay station in the case of receiving power or receiving quality in the mobile terminal apparatus 2 being smaller than receiving power or receiving quality in the mobile terminal apparatus 3 in the frequency band #2. By doing so, radio frequency interference between the mobile terminal apparatus 2 as a new relay station and the radio communication apparatus 5 or 6 as a base station or an existing relay station can be controlled and communication quality improves.

Furthermore, it is assumed that the receiving power or receiving quality of signals from only one of the radio communication apparatus 5 and 6 measured by the mobile terminal apparatus 2 which functions as a relay station is higher than the determined threshold Tr2. In this case, the control section 1b of the communication control apparatus 1 may exercise control so that a relay path will be set between the mobile terminal apparatus 2 and the one radio communication apparatus. Moreover, only if a signal the receiving power or receiving quality of which is higher than the determined threshold Tr2 is received, the control section 2b of the mobile terminal apparatus 2 may exercise control so that a request to function as a relay station will be sent to the communication control apparatus 1. By doing so, the stability of radio communication relay can be improved.

Second Embodiment

Figure 2:
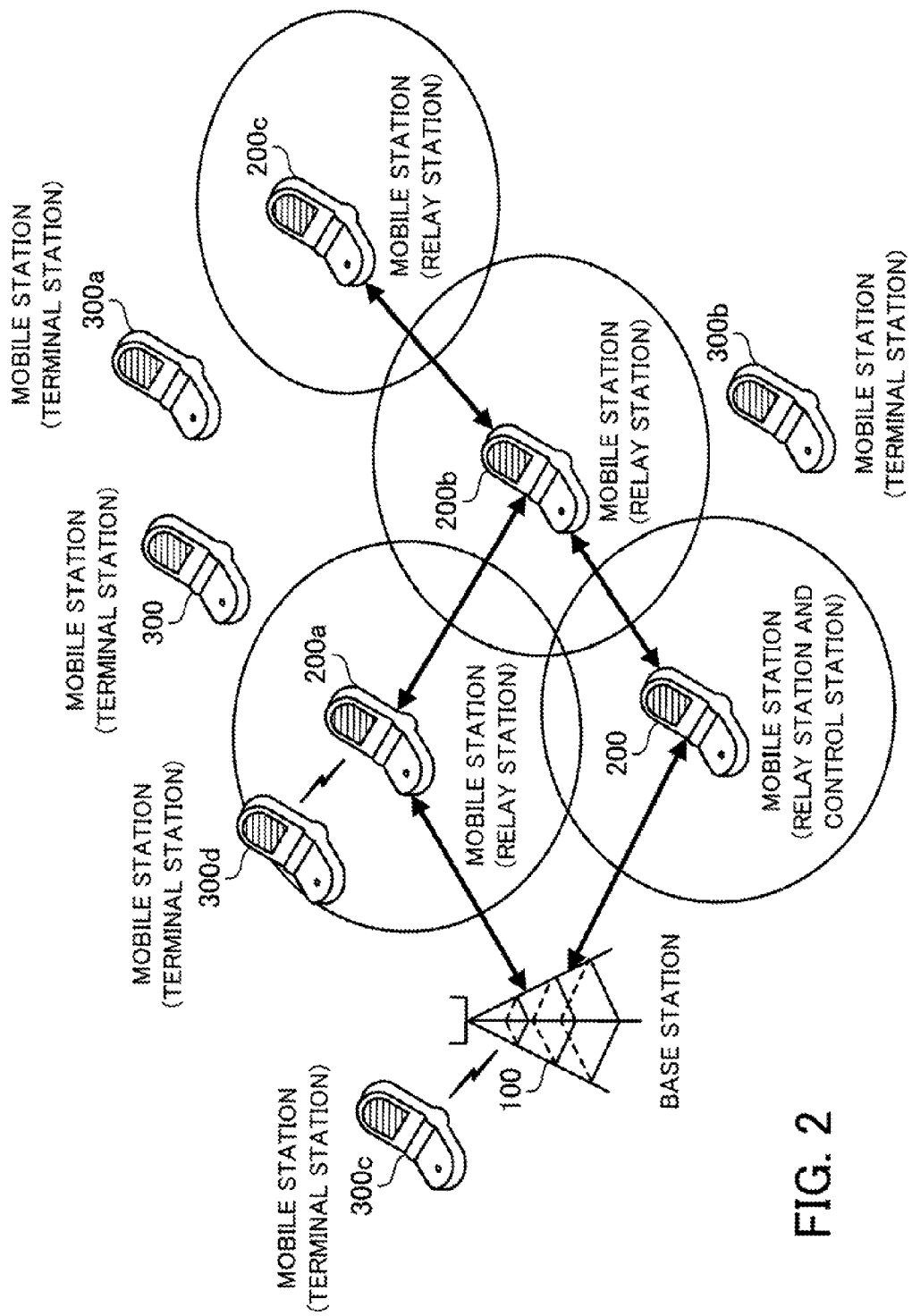
FIG. 2 illustrates a mobile communication system according to a second embodiment.

FIG. 2 illustrates a mobile communication system according to a second embodiment. A mobile communication system according to a second embodiment includes a base station 100 and mobile stations 200, 200a, 200b, 200c, 300, 300a, 300b, 300c, and 300d.

The base station 100 is a fixed radio communication apparatus. When any mobile station accesses the base station 100, the base station 100 establishes connection with the mobile station and performs radio communication. The base station 100 can control assignment of radio resources to the mobile stations 200, 200a, 200b, 200c, 300, 300a, 300b, 300c, and 300d. Wired connection may be established between the base station 100 and a core network (not illustrated) in which packet switching is performed in accordance with a communication protocol such as the IP (Internet Protocol). In addition, wired connection may be established between the base station 100 and an upper station which controls a plurality of base stations including the base station 100.

Each of the mobile stations 200, 200a, 200b, 200c, 300, 300a, 300b, 300c, and 300d is a mobile radio communication apparatus and can function as a terminal station or a relay station. If each mobile station functions as a terminal station, it accesses the base station 100 or any relay station, establishes connection with a radio communication apparatus it accesses, and performs radio communication. On the other hand, if each mobile station functions as a relay station, it establishes connection with the base station 100 or another relay station, performs radio communication in which it is a source or a destination, and relays radio communication performed by another mobile station which functions as a terminal station.

In this example, each of the mobile stations 200, 200a, 200b, and 200c functions as a relay station. Connection for relay is established between the base station 100 and the mobile station 200, between the base station 100 and the mobile station 200a, between the mobile station 200 and the mobile station 200b, between the mobile station 200a and the mobile station 200b, and between the mobile station 200b and the mobile station 200c. For example, if the base station 100 transmits data to the mobile station 200b, communication is relayed via the path (base station 100)-(mobile station 200 or mobile station 200a)-(mobile station 200b).

In this mobile communication system three bands #1, #2, and #3 are prepared for relay by a relay station. The mobile stations 200, 200a, 200b, and 200c use the bands #3, #1, #2, and #1 respectively. Adjacent relay stations use different bands. By doing so, radio frequency interference can be controlled.

Each of the mobile stations 300, 300a, 300b, 300c, and 300d functions as a terminal station. A terminal station performs radio communication by the use of a band used by a base station or a relay station to which it is connected. Each of the mobile stations 300, 300a, 300b can communicate with the mobile station 200, 200a, 200b, or 200c. However, each of the mobile stations 300, 300a, 300b does not receive a signal the receiving power of which is higher than the threshold Tr1 from any of the mobile stations 200, 200a, 200b, and 200c. The mobile station 300c receives a signal the receiving power of which is higher than the threshold Tr1 from the base station 100 and communicates with the base station 100. The mobile station 300d receives a signal the receiving power of which is higher than the threshold Tr1 from the mobile station 200a and communicates with the mobile station 200a.

In addition, the mobile station 200 functions as a control station. A control station exercises multihop relay control such as selecting a mobile station which is made to function as a relay station or selecting a band to be used by each relay station. When the number of relay stations increases or decreases, a control station updates information indicative of relay paths and sends it to each relay station.

The mobile communication system illustrated in FIG. 2 includes the base station. However, multihop relay control by a control station (mobile station 200) can be applied to a mobile communication system not including a base station. Furthermore, in the mobile communication system illustrated in FIG. 2, the mobile station 200 functions as a control station. However, another radio communication apparatus may function as a control station. For example, another relay station, the base station 100, or an upper station (not illustrated) may function as a control station. A radio communication apparatus which functions as a control station may be determined permanently in advance or be changed properly according to the state of communication. In the latter case, the base station 100 may designate a radio communication apparatus which functions as a control station. Each relay station in the mobile communication system illustrated in FIG. 2 is a mobile radio communication apparatus. However, a relay station which is a fixed radio communication apparatus may be included.

In the above description the three bands #1, #2, and #3 are prepared for a relay station. However, four or more bands may be prepared. Moreover, in the second embodiment receiving power measured by the mobile stations 300, 300a, 300b is referred to for selecting a relay station. As described in the first embodiment, however, receiving quality such as SNR may be referred to.

In the following description a base station, a control station, a relay station, and a terminal station may be abbreviated to BS, CS, RS, and MS respectively. "RS#2," and "RS#3" are given as IDs (IDentifications) to the mobile stations 200a, 200b, and 200c, respectively, each of which functions as a relay station. "RS#4" is given as ID to the mobile station 200 which functions as a relay station. "MS#1," "MS#2," and "MS#3" are given as IDs to the mobile stations 300, 300a, and 300b each of which functions as a terminal station.

Figure 3:
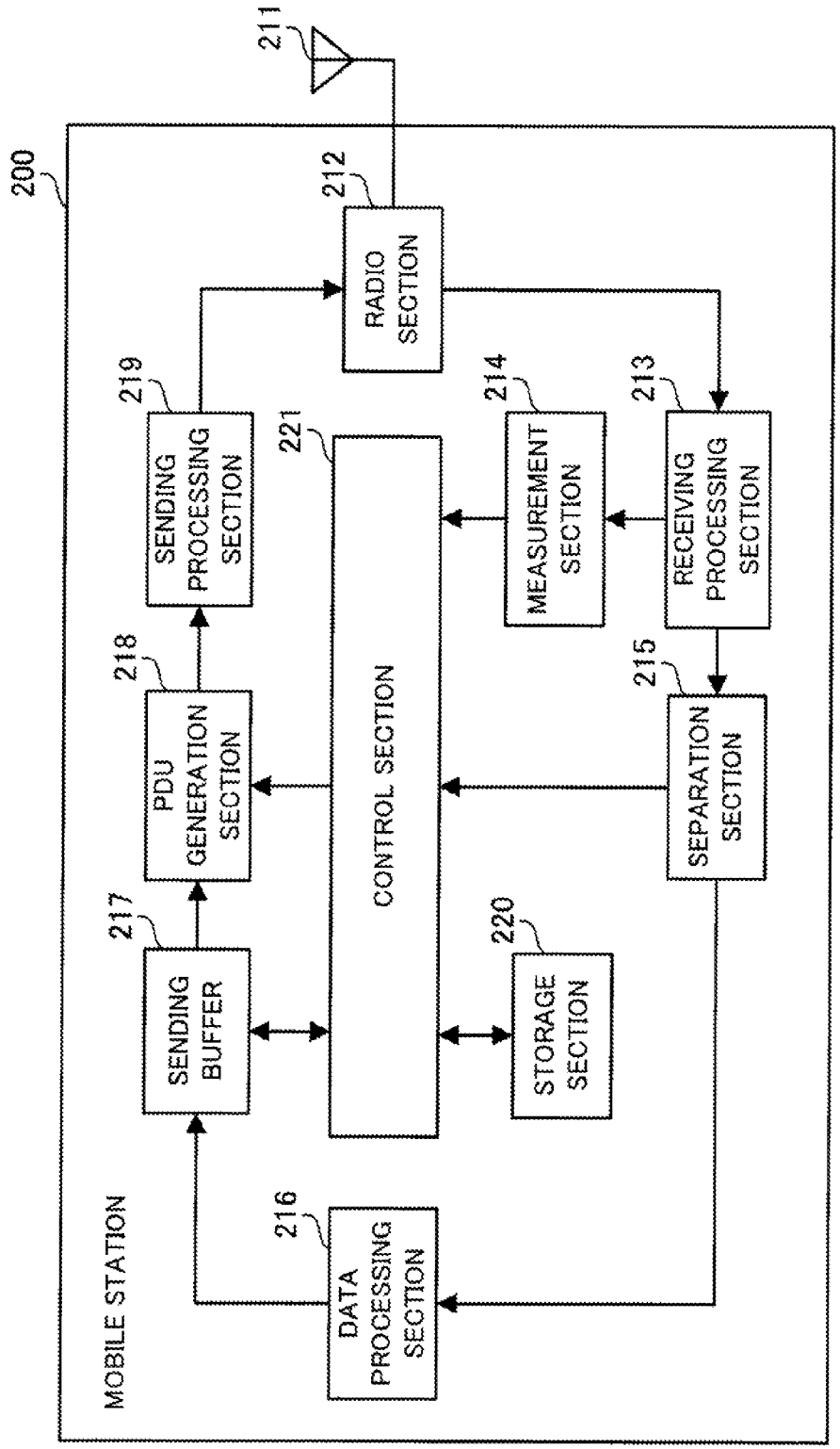
FIG. 3 is a block diagram of a mobile station.

FIG. 3 is a block diagram of a mobile station. The mobile station 200 includes an antenna 211, a radio section 212, a receiving processing section 213, a measurement section 214, a separation section 215, a data processing section 216, a sending buffer 217, a PDU generation section 218, a sending processing section 219, a storage section 220, and a control section 221.

Each of the mobile stations 200a, 200b, 200c, 300, 300a, 300b, 300c, and 300d can be realized by using the same modules that are included in the mobile station 200. Description will be given on the premise that the mobile station 200 can function as any of a terminal station, a relay station, and a control station. The base station 100 can also be realized by using the same modules that are included in the mobile station 200. However, the base station 100 has a radio resource scheduling function further.

The antenna 211 is an antenna both for sending and for receiving. The antenna 211 outputs a received radio signal to the radio section 212. In addition, the antenna 211 outputs a transmitted signal acquired from the radio section 212 as a radio signal. However, the mobile station 200 may include a sending antenna and a receiving antenna which are distinct from each other.

The radio section 212 performs radio signal processing. That is to say, the radio section 212 converts the received signal acquired from the antenna 211 to a digital base band signal and outputs the digital base band signal to the receiving processing section 213. In addition, the radio section 212 converts a transmitted digital base band signal acquired from the sending processing section 219 to a transmitted radio signal and outputs the transmitted radio signal to the antenna 211. The radio section 212 includes a power amplifier, a frequency converter, a BPF (Band-Pass Filter), an A/D (Analog-to-Digital) converter, a D/A (Digital-to Analog) converter, and the like for performing radio signal processing.

The receiving processing section 213 demodulates and decodes the received signal acquired from the radio section 212 and extracts user data and control information. A decoding process includes deinterleaving, error correction, error detection, and the like. A received signal modulation or coding method may be determined permanently in advance or be selected properly according to communication quality. The receiving processing section 213 then outputs the user data and the control information obtained to the separation section 215. In addition, the receiving processing section 213 outputs the received signal to the measurement section 214.

The measurement section 214 measures receiving power on the basis of the received signal acquired from the receiving processing section 213. The measurement section 214 can use a known control signal, such as a preamble, a synchronizing signal, or a pilot signal included in a radio frame, for measuring receiving power. The measurement section 214 can measure receiving power for each source which sends a signal by using a control signal which is unique to the base station and each relay station. The measurement section 214 then outputs the results of measuring receiving power to the control section 221. Receiving quality, such as SNR, may be measured in place of or in addition to receiving power.

The separation section 215 separates user data the destination of which is the mobile station 200 from the user data and the control information acquired from the receiving processing section 213, and outputs the separated user data to the data processing section 216. In addition, the separation section 215 outputs control information the destination of which is the mobile station 200 to the control section 221. If the mobile station 200 functions as a relay station, the separation section 215 also outputs transferred user data and control information to the control section 221. The control information outputted to the control section 221 includes various kinds of request messages sent by other mobile stations, the results of measuring receiving power by other mobile stations, and the like.

The data processing section 216 performs various kinds of data processing by the use of the user data which is acquired from the separation section 215 and the destination of which is the mobile station 200. Data processing performed by the data processing section 216 includes, for example, reproducing voice by the use of voice data and displaying an image by the use of image data. When the data processing section 216 generates transmitted user data, the data processing section 216 outputs it to the sending buffer 217.

The sending buffer 217 is a buffer memory which temporarily holds the user data acquired from the data processing section 216. The sending buffer 217 sequentially outputs the user data it holds to the PDU generation section 218 in accordance with instructions from the control section 221.

The PDU generation section 218 acquires the user data from the sending buffer 217. In addition, the PDU generation section 218 acquires the control information from the control section 221. If the mobile station 200 functions as a relay station, the separation section 215 also acquires the transferred user data and control information from the control section 221. The control information acquired from the control section 221 includes a request message sent to the base station 100 or another mobile station, the result of measuring receiving power, and the like. The PDU generation section 218 converts the user data and the control information to a PDU (Protocol Data Unit) packet format. The PDU generation section 218 then outputs the user data and the control information converted to the PDU packet format to the sending processing section 219.

The sending processing section 219 acquires the user data and the control information from the PDU generation section 218, performs a coding process and modulation, and generates a radio frame. The coding process includes adding parity for error detection, error correction coding, and interleaving. A convolutional code, a turbo code, or the like can be used for coding. QPSK (Quadrature Phase Shift Keying), 16QAM (Quadrature Amplitude Modulation), or the like can be used as a modulation mode. The sending processing section 219 then outputs a transmitted signal which is the generated radio frame to the radio section 212.

The storage section 220 stores various kinds of data used by the control section 221 for performing a control process. For example, a nonvolatile memory can be used as the storage section 220. The data stored in the storage section 220 is read out or updated by the control section 221. For example, if the mobile station 200 functions as a control station or a relay station, information indicative of a relay path between relay stations is stored in the storage section 220. In addition, if the mobile station 200 functions as a control station, data used for performing a calculation at the time of selecting a relay station is stored in the storage section 220.

The control section 221 controls radio communication. The contents of the control process performed by the control section 221 depend on whether the mobile station 200 functions as a terminal station or a relay station.

If the mobile station 200 functions as a terminal station, the control section 221 detects a base station or a relay station to which the mobile station 200 can be connected on the basis of the receiving power measured by the measurement section 214. The control section 221 connects the mobile station 200 to any base station or relay station and performs radio communication. However, if there is no base station or relay station from which a signal the receiving power of which is higher than the threshold Tr1 is received and if a signal the receiving power of which is higher than the threshold Tr2 (TR1>TR2) is received from at least one base station or relay station, then the control section 221 generates an RS switching request indicative of the request that the mobile station 200 should function as a relay station as control information. The control section 221 then outputs the RS switching request to the PDU generation section 218 and makes the PDU generation section 218 send the RS switching request to a control station.

If the mobile station 200 functions as a relay station, the control section 221 refers to the relay path information stored in the storage section 220 and controls the transfer of the user data and the control information. In addition, the control section 221 makes a terminal station connected to the mobile station 200 report the result of measuring receiving power thereto, and monitors a state in which the terminal station communicates. If the control section 221 detects a terminal station which is more suitable as a relay station than the mobile station 200, then the control section 221 generates an RS switching request indicative of a change in relay station as control information. The control section 221 then outputs the RS switching request to the PDU generation section 218 and makes the PDU generation section 218 send the RS switching request to the control station. However, if the mobile station 200 functions as the control station, there is no need to send the RS switching request.

If the mobile station 200 functions as the control station, the control section 221 exercises relay station control including selecting a relay station and selecting a band used by a relay station on the basis of RS switching requests received from a terminal station and a relay station. The control section 221 updates the relay path information stored in the storage section 220 on the basis of the result of the relay station control. When the control section 221 updates the relay path information, the control section 221 outputs the relay path information after the update to the PDU generation section 218 as control information and makes the PDU generation section 218 send the relay path information after the update to the base station 100 and each relay station.

Figure 4:
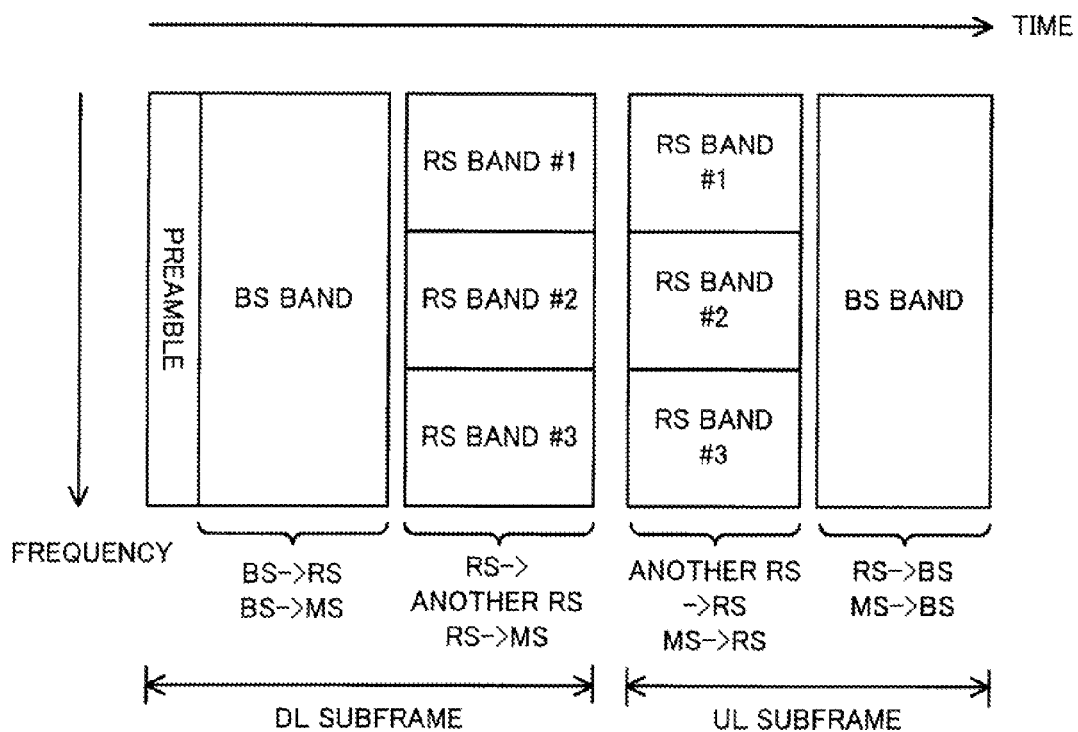
FIG. 4 is an example structure of a radio frame.

FIG. 4 is an example structure of a radio frame. With a radio frame illustrated in FIG. 4, OFDM (Orthogonal Frequency Division Multiplexing) is used as a multiplexing method and TDD (Time Division Duplex) is used as a duplexing method. In FIG. 4, a horizontal axis indicates time and a vertical axis indicates a frequency. This radio frame includes a DL (DownLink) subframe in the first half and an UL (UpLink) subframe in the second half. A gap interval is inserted between the DL subframe and the UL subframe.

The DL subframe includes a preamble, a BS band, and RS bands #1 through #3. The preamble includes a known signal for identifying the head of the radio frame. The BS band is used for communication from the base station to a relay station and from the base station to a terminal station. The RS bands #1 through #3 are used for communication between relay stations and from a relay station to a terminal station. The RS bands #1 through #3 do not overlap one another in frequency band. Each relay station can use one of the RS bands #1 through #3. A gap interval is inserted between the BS band and the RS bands #1 through #3.

The UL subframe includes RS bands #1 through #3 and a BS band. The RS bands #1 through #3 are used for communication between relay stations and from a terminal station to a relay station. The BS band is used for communication from a relay station to the base station and from a terminal station to the base station. The RS bands #1 through #3 do not overlap one another in frequency band. This is the same with the DL subframe. Each relay station can use one of the RS bands #1 through #3. A gap interval is inserted between the RS bands #1 through #3 and the BS band.

User data or control information can be transmitted by the use of the BS bands and the RS bands #1 through #3. Furthermore, a synchronizing signal or a pilot signal may be included in the BS bands and the RS bands #1 through #3.

With the radio frame illustrated in FIG. 4, OFDM and TDD are adopted. In the mobile communication system according to the second embodiment, however, a radio frame having any structure can be used. In addition, with the radio frame illustrated in FIG. 4, the RS bands #1 through #3 are continuous on the frequency axis. However, discontinuous frequency bands may be used.

FIG. 5 is an example data structure of a relay station table. A relay station table 222 is stored in the storage section 220 of the mobile station 200 which functions as a control station. The mobile stations 200a, 200b, and 200c each of which functions as a relay station can also hold data which is the same as the relay station table 222.

The relay station table 222 includes RS_ID, Band, and Path items. Pieces of information horizontally arranged are associated with one another. An identification of a relay station is set in the RS_ID item. Information indicative of a band used by the relay station is set in the Band item. Information indicative of a relay path from the control station to the relay station is set in the Path item.

For example, relay station information which is made up of RS#1 set in the RS_ID item, band #1 set in the Band item, and RS#4-BS#1-RS#1 set in the Path item is registered in the relay station table 222. This relay station information means that the mobile station 200a uses the RS band #1 and that the relay path of (mobile station 200)-(base station 100)-(mobile station 200a) exists. The relay station table 222 stored in the storage section 220 is updated by the control section 221 as occasion arises.

Figure 6:
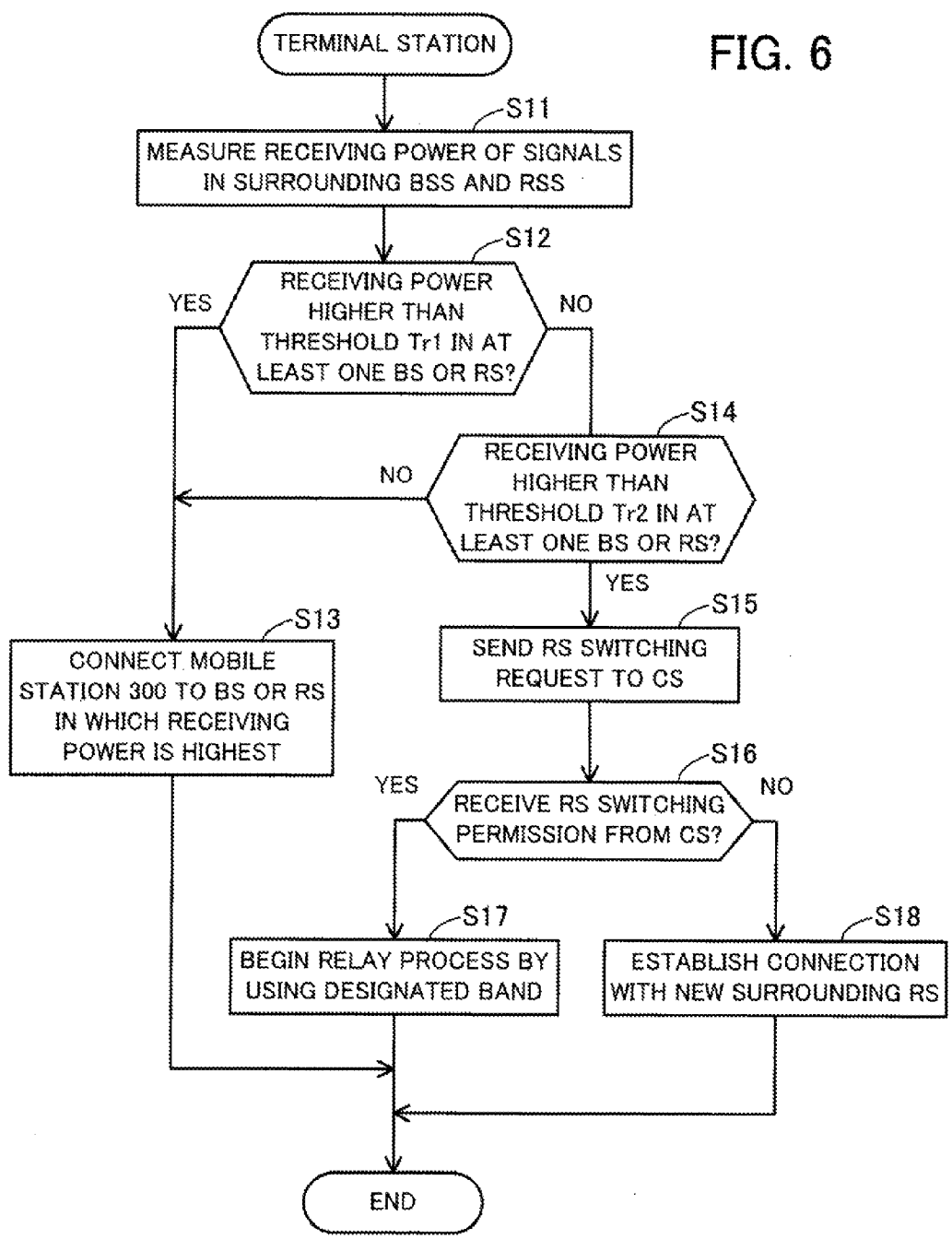
FIG. 6 is a flow chart of the flow of a process by a terminal station.

FIG. 6 is a flow chart of the flow of a process by a terminal station. It is assumed that the mobile station 300 which functions as a terminal station performs a process. A process illustrated in FIG. 6 will now be described in order of step number. A process illustrated in FIG. 6 will be performed continually (periodically, for example) by the terminal station.

(Step S11) The mobile station 300 measures receiving power in surrounding base stations and relay stations on the basis of signals transmitted from the base station 100 and the mobile stations 200, 200a, 200b, and 200c (relay stations).

(Step S12) The mobile station 300 determines whether the receiving power measured in step S11 is higher than the threshold Tr1 in at least one surrounding base station or relay station. If the receiving power measured in step S11 is higher than the threshold Tr1 in at least one surrounding base station or relay station, step S13 is performed next. If there is no surrounding base station or relay station in which the receiving power measured in step S11 is higher than the threshold Tr1, step S14 is performed next.

(Step S13) The mobile station 300 selects one of the surrounding base stations and relay stations in which the receiving power of a received signal is the highest as a station to which the mobile station 300 is connected. If connection is not yet established between the mobile station 300 and the selected station, then the mobile station 300 accesses the selected station and establishes connection. After that, the mobile station 300 terminates the process.

(Step S14) The mobile station 300 determines whether the receiving power measured in step S11 is higher than the threshold Tr2 (Tr1>Tr2) in at least one surrounding base station or relay station. If the receiving power measured in step S11 is higher than the threshold Tr2 in at least one surrounding base station or relay station, step S15 is performed next. If there is no surrounding base station or relay station in which the receiving power measured in step S11 is higher than the threshold Tr2, step S13 is performed next. If the mobile station 300 can be connected to the base station 100, then the mobile station 300 may preferentially select the base station 100 in the latter case as a station to which the mobile station 300 is connected.

(Step S15) The mobile station 300 sends an RS switching request to a control station (mobile station 200). At this time the mobile station 300 adds information (receiving power information) indicative of the receiving power measured in step S11 to the RS switching request. The mobile station 300 may use any base station or relay station for sending the RS switching request, if possible. For example, the mobile station 300 can send the RS switching request via the mobile station 200a (relay station).

(Step S16) The mobile station 300 determines whether it receives RS switching permission from the control station (mobile station 200) in a certain period of time after sending the RS switching request in step S15. If the mobile station 300 receives RS switching permission from the control station (mobile station 200) in the certain period of time after sending the RS switching request in step S15, step S17 is performed next. If the mobile station 300 does not receive RS switching permission from the control station (mobile station 200) in the certain period of time after sending the RS switching request in step S15, step S18 is performed next. The latter case may be the case where a response to the RS switching request cannot be acquired in the certain period of time or where an RS switching rejection is received.

(Step S17) The mobile station 300 begins a relay process by the use of an RS band designated in the RS switching permission. To be concrete, the mobile station 300 establishes connection for relay with at least one of base stations and relay stations in which the receiving power is higher than the threshold Tr2. After a terminal station accesses the mobile station 300 and connection is established between the mobile station 300 and the terminal station, user data and control information are transferred between a base station or another relay station and the terminal station.

(Step S18) The mobile station 300 checks whether a new relay station has appeared. If the mobile station 300 can detect a new relay station, then the mobile station 300 accesses the new relay station and establishes connection. The RS switching rejection received from the control station (mobile station 200) may include information indicative of a mobile station designated newly as a relay station. If the mobile station 300 can receive information indicative of a new relay station, the mobile station 300 may detect the new relay station on the basis of the information. Furthermore, the mobile station 300 may detect a new relay station by picking up a known signal transmitted therefrom.

Step S11 of the process is performed by a module corresponding to the measurement section 214. Steps S12 through S18 of the process are performed by a module corresponding to the control section 221.

As has been described, the terminal station measures the receiving power of signals received from surrounding base stations and relay stations. If the receiving power is higher than the threshold Tr1, that is to say, if the terminal station is near any of the base stations and the relay stations, then the terminal station performs radio communication under the control of the existing base station or relay station. On the other hand, if the receiving power is lower than or equal to the threshold Tr1, that is to say, if the terminal station is distant from all of the base stations and the relay stations, then the terminal station considers functioning as a new relay station.

In the above description the terminal station does not send an RS switching request to the control station if a signal the receiving power of which is higher than the threshold Tr2 is not received. That is to say, the terminal station determines whether if the terminal station itself functions as a relay station, the communication quality of a relay path can be secured adequately. As a result, the control of relay station selection can be made efficient. However, the following method is possible. The terminal station sends an RS switching request regardless of whether a signal the receiving power of which is higher than the threshold Tr2 is received. In this case, the control station should determine whether the communication quality of a relay path can be secured adequately.

FIG. 7 is example results of measuring receiving power. The mobile stations 300, 300a, and 300b (terminal stations) do not receive signals the receiving power of which is higher than the threshold Tr1 from any of the base station 100 and the mobile stations 200, 200a, 200b, and 200c (relay stations). Accordingly, the mobile station 200 (control station) receives the results of measuring receiving power illustrated in FIG. 7 from the mobile stations 300, 300a, and 300b.

The mobile station 300 (MS#1) receives signals the receiving power of which is higher than the threshold Tr2 from the mobile station 200a (RS#1) and the mobile station 200b (RS#2). In addition, the mobile station 300 (MS#1) receives signals the receiving power of which is lower than the threshold Tr2 from the mobile station 200c (RS#3) and the mobile station 200 (RS#4). The mobile station 300a (MS#2) receives signals the receiving power of which is higher than the threshold Tr2 from the mobile stations 200a, 200b, and 200c. In addition, the mobile station 300a (MS#2) receives signals the receiving power of which is lower than the threshold Tr2 from the mobile station 200. The mobile station 300b (MS#3) receives signals the receiving power of which is higher than the threshold Tr2 from the mobile stations 200 and 200b. In addition, the mobile station 300b (MS#3) receives signals the receiving power of which is lower than the threshold Tr2 from the mobile stations 200a and 200c.

The mobile stations 200a and 200c transmit signals in the RS band #1. The mobile station 200b transmits signals in the RS band #2. The mobile station 200 transmits signals in the RS band #3.

Figure 8:
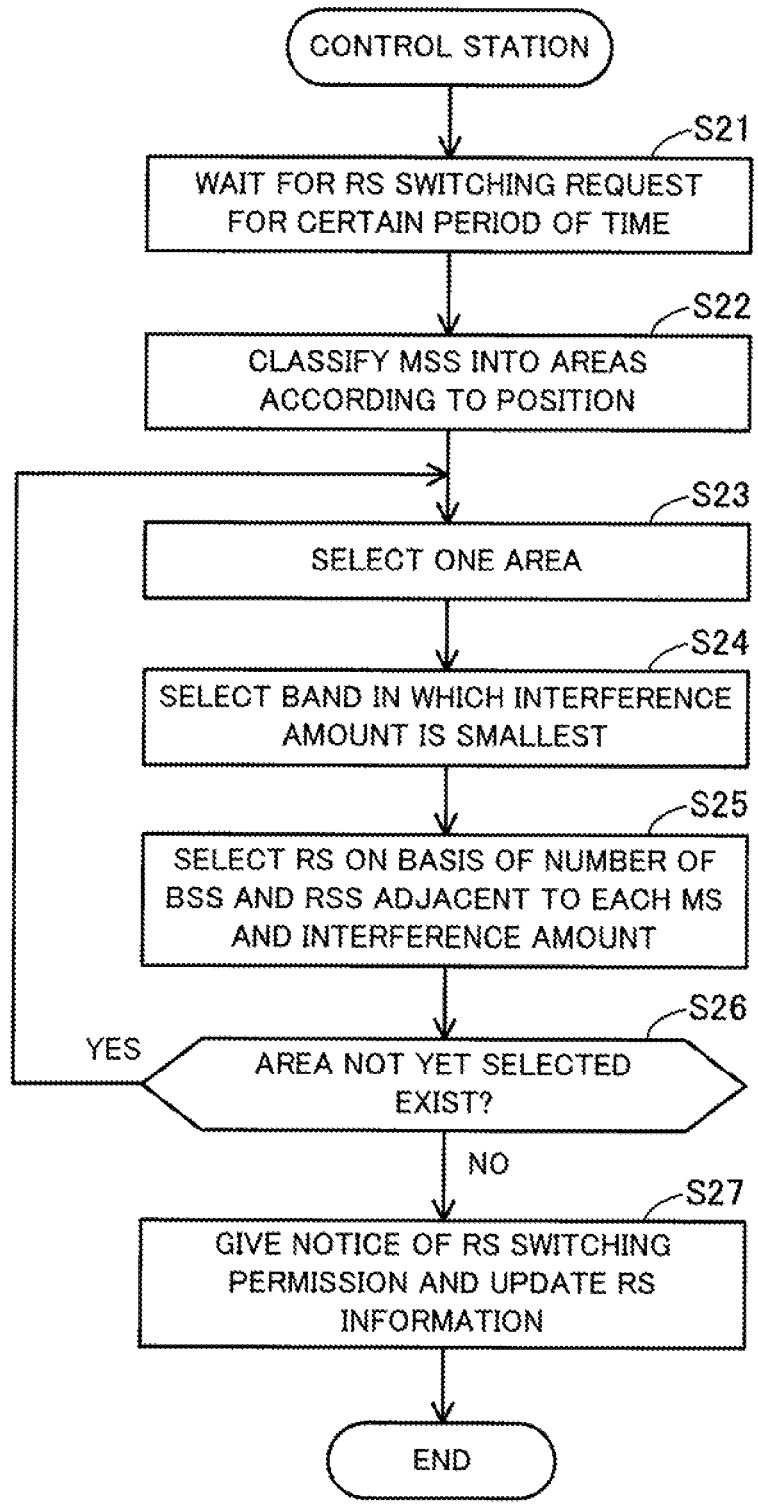
FIG. 8 is a first flow chart of the flow of a process by a control station.

FIG. 8 is a first flow chart of the flow of a process by a control station. A process illustrated in FIG. 8 will now be described in order of step number. A process illustrated in FIG. 8 will be performed continually (periodically, for example) by the mobile station 200 which functions as a control station.

(Step S21) The mobile station 200 waits for the receiving of an RS switching request for a certain period of time after performing a relay station selection process the last time. If the mobile station 200 receives RS switching requests from a plurality of mobile stations each of which functions as a terminal station, then the mobile station 200 performs the following steps S22 through S27. On the other hand, if the mobile station 200 does not receive RS switching requests from a plurality of mobile stations, then the mobile station 200 waits further for the receiving of an RS switching request for the certain period of time.

(Step S22) The mobile station 200 classifies the plurality of mobile stations which transmit the RS switching requests into one or more areas by the use of receiving power information added to the RS switching requests. That is to say, the mobile station 200 specifies a group of mobile stations which are considered to be close in position (to be in a certain area) on the basis of the receiving power information. For example, the mobile station 200 can estimate how close two mobile stations are in position by calculating a correlation between the receiving power of signals which the two mobile stations receive from each relay station (how close the receiving power of signals which the two mobile stations receive from each relay station are in magnitude). Moreover, the mobile station 200 may estimate the position of each mobile station by referring to relay path information, or information indicative of adjacency relationships between a plurality of relay stations.

If the mobile station 200 can acquire coordinate information, such as GPS (Global Positioning System) information, from each mobile station, then the mobile station 200 may specify the present position of each mobile station by the use of the coordinate information.

(Step S23) The mobile station 200 selects one area which includes a plurality of mobile stations from the areas specified in step S22.

(Step S24) The mobile station 200 specifies the plurality of mobile stations included in the area selected in step S23 and extracts receiving power information for each of the plurality of mobile stations specified. The mobile station 200 then calculates an interference amount in each of the RS bands #1 through #3 in the area on the basis of the receiving power information. For example, an interference amount in an area can be defined as the total of receiving power in each RS band. The mobile station 200 selects an RS band in which an interference amount is the smallest in the area as a band to be used by a relay station in the area.

(Step S25) The mobile station 200 calculated the number of base stations and relay stations adjacent to each of the plurality of mobile stations included in the area selected in step S23. A base station or a relay station adjacent to each of the plurality of mobile stations included in the area selected in step S23 can be defined as a base station or a relay station which transmits a signal the receiving power of which is higher than the threshold Tr2. In addition, the mobile station 200 specifies receiving power (interference amount) in the RS band selected in step S24 for each of the plurality of mobile stations.

The mobile station 200 then selects one mobile station which is made to function as a relay station from the plurality of mobile stations included in the area on the basis of the number of base stations and relay stations adjacent to each of the plurality of mobile stations included in the area and an interference amount for each mobile station. For example, the mobile station 200 specifies a mobile station for which the number of adjacent base stations and relay stations is the largest. If there is more than one mobile station for which the number of adjacent base stations and relay stations is the largest, then the mobile station 200 selects a mobile station for which an interference amount is the smallest from the more than one mobile station specified.

(Step S26) The mobile station 200 determines whether all areas that include a plurality of mobile stations are selected in step S23. If there is an area which includes a plurality of mobile stations and which is not yet selected in step S23, step S23 is performed next. If all areas that include a plurality of mobile stations are selected in step S23, step S27 is performed next.

(Step S27) The mobile station 200 gives the mobile station selected in step S25 as a relay station notice of RS switching permission. Information indicative of the RS band selected in step S24, that is to say, of the RS band to be used by the mobile station to which the notice of RS switching permission is given is added to the notice of RS switching permission.

In addition, the mobile station 200 registers the new relay station in the relay station table 222 stored in the storage section 220 and gives the mobile stations 200a, 200b, and 200c (existing relay stations) instructions to set a relay path to the new relay station.

Furthermore, the mobile station 200 may send notice of RS switching rejection to mobile stations not selected as relay stations of the plurality of mobile stations which transmit the RS switching requests. Information indicative of the relay station in the same area that includes the mobile stations to which the notice of RS switching rejection is sent may be added to the notice of RS switching rejection.

Steps S21 through S27 of the process are performed by the control section 221.

As has been described, the control station estimates the present position of each of mobile stations (terminal stations) which send RS switching requests, and classifies the mobile stations according to area. If a plurality of mobile stations are in the same area, the control station selects an RS band in which an interference amount is the smallest in the area as an RS band to be used in the area. In addition, the control station selects a mobile station which functions as a relay station on the basis of receiving power information.

As a result, control can be exercised so that a plurality of terminal stations which are a certain distance or more away from any base station and existing relay station are grouped and so that a new relay station communicates with a base station or an existing relay station on behalf of a group of the plurality of terminal stations. That is to say, a plurality of terminal stations can be grouped properly. Furthermore, an RS band is selected so that radio frequency interference between the new relay station and an existing relay station is controlled.

FIG. 9 is an example data structure of an adjacency relationship table. While performing the process illustrated in FIG. 8, the control section 221 of the mobile station 200 constructs an adjacency relationship table 223. The adjacency relationship table 223 is stored in the storage section 220. The adjacency relationship table 223 is constructed on the basis of the results of measuring receiving power illustrated in FIG. 7.

The adjacency relationship table 223 includes MS_ID, Adjacent BS/RS, Number of Adjacent BSs/RSs, and Estimated Area items. Pieces of information horizontally arranged are associated with one another. An identification of a terminal station which sends an RS switching request is set in the MS_ID item. An identification of an adjacent base station or relay station is set in the Adjacent BS or RS item. An adjacent base station or relay station meets the condition that (threshold Tr1)≧(receiving power)>(threshold Tr2).

The number of adjacent base stations and relay stations is set in the Number of Adjacent BSs and RSs item. A symbol for identifying an area to which the terminal station belongs is set in the Estimated Area item.

For example, information which consists of "MS#1" set in the MS_ID item, "2" set in the Number of Adjacent BSs and RSs item, and "A" set in the Estimated Area item is registered in the adjacency relationship table 223. In addition, information which consists of "MS#2" set in the MS_ID item, "3" set in the Number of Adjacent BSs and RSs item, and "A" set in the Estimated Area item is registered in the adjacency relationship table 223. These pieces of information mean that the number of base stations and relay stations adjacent to the mobile station 300a is larger than that of base stations and relay stations adjacent to the mobile station 300 and that the mobile stations 300 and 300a belong to the same area.

FIG. 10 is an example data structure of an interference amount table. While performing the process illustrated in FIG. 8, the control section 221 of the mobile station 200 constructs an interference amount table 224. The interference amount table 224 is stored in the storage section 220. The interference amount table 224 is constructed on the basis of the relay station table 222 illustrated in FIG. 5 and the results of measuring receiving power illustrated in FIG. 7.

The interference amount table 224 includes Band ID, RS_ID, Receiving Power, and Interference Amount items. Pieces of information horizontally arranged are associated with one another. An identification of an RS band is set in the Band ID item. An identification of a relay station which uses each RS band is set in the RS_ID item. The total of receiving power in each RS band in each terminal station is set in the Receiving Power item. An interference amount in each area, that is to say, the total of receiving power in each RS band in each area is set in the Interference Amount item. However, the area B does not include a plurality of terminal stations, so the area B is not contained in FIG. 10.

For example, information which consists of "band #1" set in the Band ID item, "60" set in the MS#1 subitem of the Receiving Power item, "50" set in the MS#2 subitem of the Receiving Power item, and "110" set in the Area A subitem of the Interference Amount item is registered in the interference amount table 224. This information means that the total of the receiving power of signals in the RS band #1 which are received by the mobile station 300 (that is to say, which are transmitted from the mobile stations 200a and 200c) is 60 and that the total of the receiving power of signals in the RS band #1 which are received by the mobile station 300a is 50. An interference amount in the RS band #1 in the area A is the total of 60, which is the total of the receiving power of the signals in the RS band #1 received by the mobile station 300, and 50, which is the total of the receiving power of the signals in the RS band #1 received by the mobile station 300a.

The mobile station 200 can determine an RS band (RS band #3, in the example of FIG. 10) in which an interference amount in the area A is the smallest on the basis of the interference amount table 224 constructed. In addition, the mobile station 200 can determine a mobile station (mobile station 300a, in the example of FIG. 9) for which the number of adjacent base stations and relay stations is the largest on the basis of the adjacency relationship table 223. Furthermore, the mobile station 200 can determine a mobile station (mobile station 300a, in the example of FIG. 10) in which receiving power in a selected RS band is the lowest on the basis of the interference amount table 224.

As a result, the mobile station 200 can select an RS band and a new relay station. If a mobile station for which the number of adjacent base stations and relay stations is the largest and a mobile station in which receiving power in a selected RS band is the lowest do not match, then the former is selected preferentially as a relay station. By doing so, the stability of communication between relay stations is improved compared with the case where the latter is selected preferentially. However, the latter may be selected preferentially as a relay station.

In this case, radio frequency interference between relay stations can be controlled compared with the case where the former is selected preferentially.

Figure 11:
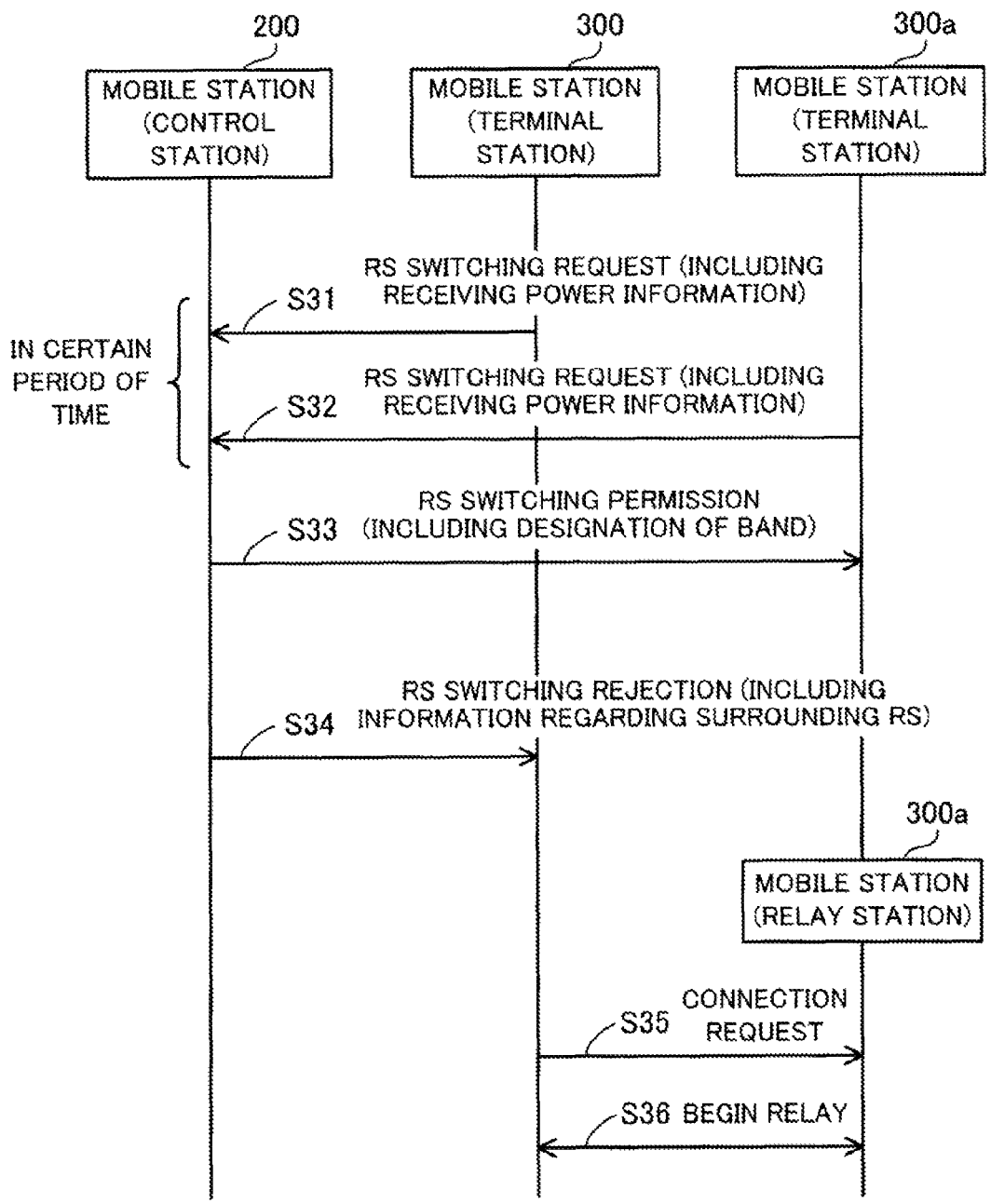
FIG. 11 is a sequence diagram of the flow of control exercised at the time of adding a relay station.

FIG. 11 is a sequence diagram of the flow of control exercised at the time of adding a relay station. An example of a control message flow illustrated in FIG. 11 will now be described in order of step number.

(Step S31) The mobile station 300 which functions as a terminal station sends the mobile station 200 which functions as a control station an RS switching request indicative of a request to function as a relay station. Receiving power information indicative of receiving power measured by the mobile station 300 is added to the RS switching request.

(Step S32) The mobile station 300a which functions as a terminal station sends the mobile station 200 an RS switching request indicative of a request to function as a relay station. Receiving power information indicative of receiving power measured by the mobile station 300a is added to the RS switching request.

(Step S33) On the basis of the RS switching requests received in steps S31 and S32, the mobile station 200 designates the mobile station 300a as a relay station and selects the RS band #3. The mobile station 200 then sends the mobile station 300a notice of RS switching permission which is indicative that the RS switching request is allowed. Information indicative of the RS band #3 selected is added to the notice of RS switching permission. The mobile station 300a begins operation as a relay station by the use of the RS band #3 designated. The mobile station 200 informs the mobile stations 200a, 200b, and 200c (existing relay stations) about a change in relay path caused by the addition of the relay station.

(Step S34) The mobile station 200 sends the mobile station 300 notice of RS switching rejection which is indicative that the RS switching request is rejected. Information indicative of the mobile station 300a which functions as a relay station and which belongs to the same area as the mobile station 300 belongs to is added to the notice of RS switching rejection.

However, the mobile station 200 may not send the mobile station 300 notice of RS switching rejection. If a response cannot be gotten from the mobile station 200 after the elapse of a certain period of time, then the mobile station 300 can determine that the RS switching request is rejected. Furthermore, information regarding a surrounding relay station may not be added to the notice of RS switching rejection. The mobile station 300 can detect the presence of the new relay station by picking up a signal transmitted thereby.

(Step S35) The mobile station 300 picks up a signal transmitted from the mobile station 300a which functions as a relay station, and sends the mobile station 300a a connection request.

(Step S36) Connection is established between the mobile stations 300 and 300a. The mobile station 300a relays user data and control information transmitted or received by the mobile station 300.

Figure 12:
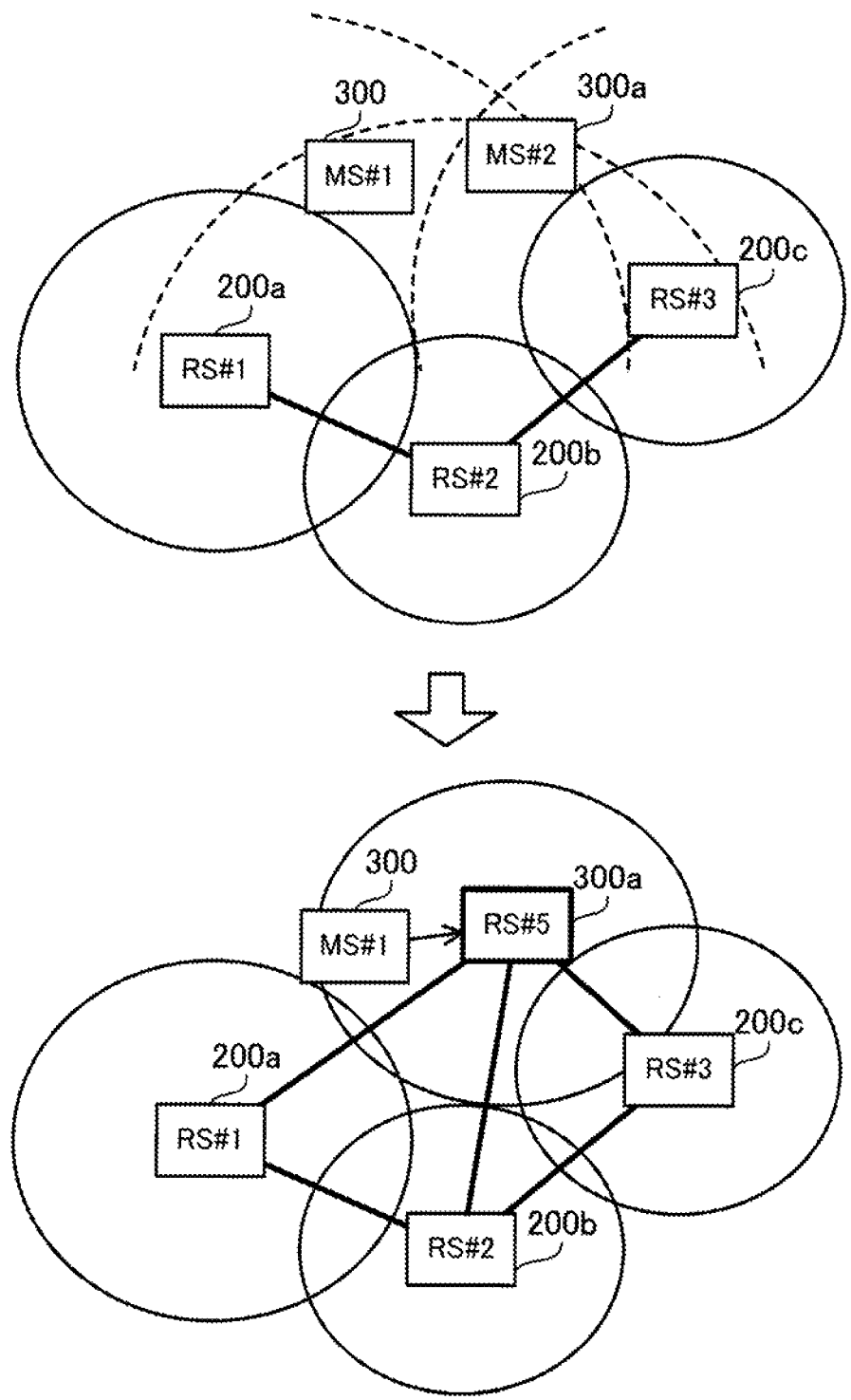
FIG. 12 illustrates a change in relay station and terminal station (part 1)

FIG. 12 illustrates a change in relay station and terminal station (part 1).

The mobile stations 300 and 300a each of which functions as a terminal station do not receive signals the receiving power of which is higher than the threshold Tr1 from any of the mobile stations 200a, 200b, and 200c each of which functions as a relay station. That is to say, the mobile stations 300 and 300a are at a certain distance or longer from the existing relay stations. However, the mobile station 300 receives signals the receiving power of which is higher than the threshold Tr2 from the mobile stations 200a and 200b. The mobile station 300a receives signals the receiving power of which is higher than the threshold Tr2 from the mobile stations 200a, 200b, and 200c. Accordingly, the mobile stations 300 and 300a request of the mobile station 200 which functions as a control station that they each should function as a relay station.

As a result, the mobile station 200 designates the mobile station 300a as a relay station. The mobile station 300a begins operation as a relay station. The mobile station 300a which is not designated as a relay station performs radio communication under the control of the mobile station 300a. That is to say, a new group represented by the mobile station 300a is formed.

At this time the mobile station 300a establishes connection for relay with adjacent base stations or relay stations, that is to say, with base stations or relay stations that meet the condition that (threshold Tr1)≧(receiving power)>(threshold Tr2). The mobile station 300a may establish connection for relay with all or part of base stations and relay stations that meet the above condition. In the latter case, the following method, for example, is possible. The mobile station 300a selects the base stations or relay stations that meet the above condition in descending order of measured receiving power and establishes connection for relay with a determined number of base stations or relay stations. In this case, the mobile station 200 which functions as a control station may select base stations or relay stations with which the mobile station 300a establishes connection for relay.

By the way, a mobile station is designated as a relay station by the above process, so a state in which a signal is received between relay stations varies because of their shifting. Therefore, in order to control radio frequency interference between relay stations, it is preferable that an RS band used by each relay station can be changed properly. In addition, it is preferable that a relay station can be changed properly according to conditions under which a signal is received. A process performed by a mobile station which functions as a relay station will now be described.

Figure 13:
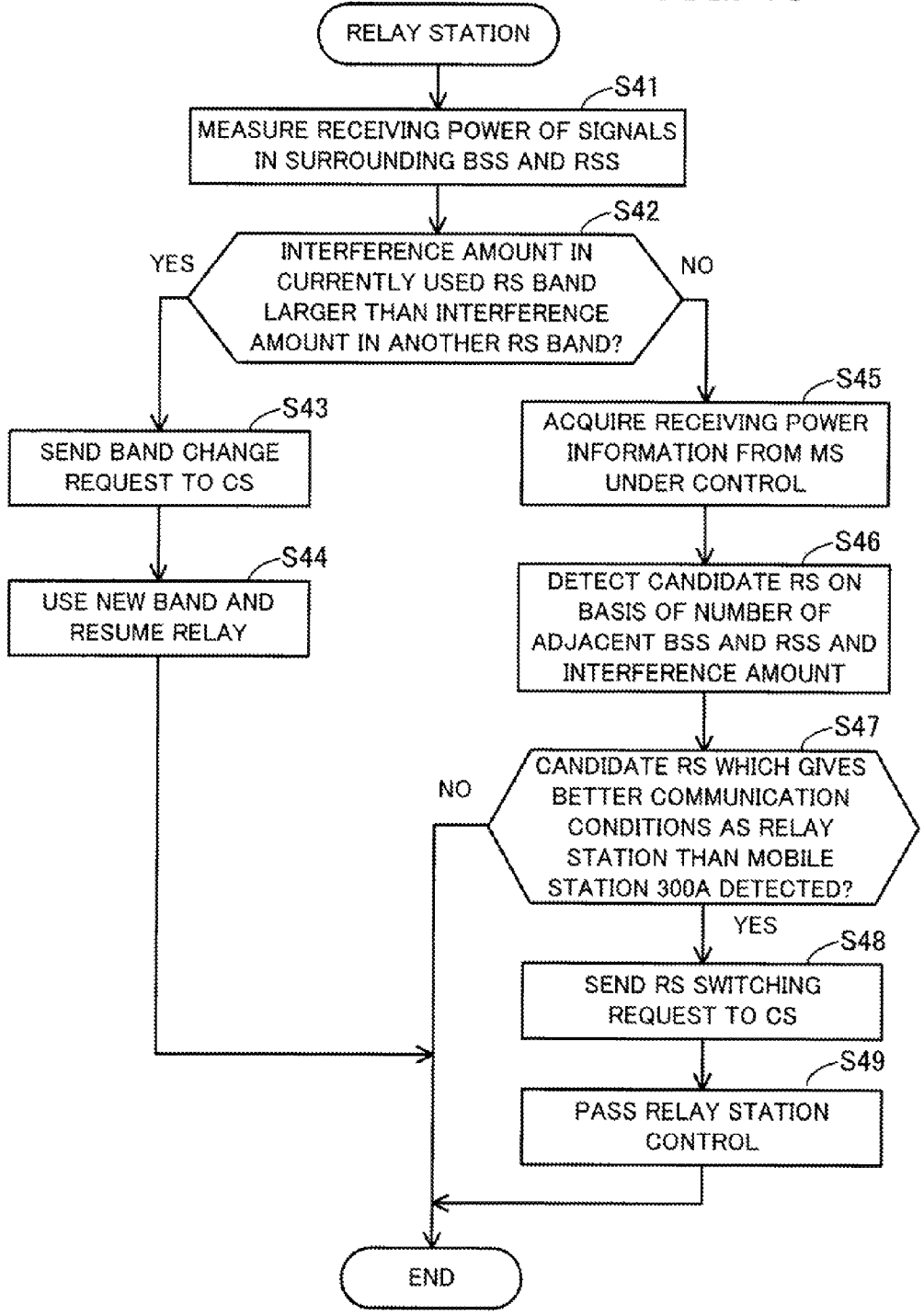
FIG. 13 is a flow chart of the flow of a process performed by a relay station.

FIG. 13 is a flow chart of the flow of a process performed by a relay station. It is assumed that the mobile station 300a which functions as a relay station performs a process. A process illustrated in FIG. 13 will now be described in order of step number. A process illustrated in FIG. 13 will be performed continually (periodically, for example) by a relay station.

(Step S41) The mobile station 300a measures receiving power in surrounding base stations and relay stations on the basis of signals transmitted by the base station 100 and the mobile stations 200, 200a, 200b, and 200c (other relay stations).

(Step S42) The mobile station 300a totals the receiving power measured in step S41 for each of the RS bands #1 through #3 and calculates an interference amount in each RS band in the mobile station 300a. The mobile station 300a then compares an interference amount in a currently used RS band with an interference amount in another RS band. If an interference amount in another RS band is smaller than the interference amount in the currently used RS band, then step S43 is performed next. If an interference amount in another RS band is not smaller than the interference amount in the currently used RS band, then step S45 is performed next.

(Step S43) The mobile station 300a specifies an RS band in which an interference amount is the smallest as an RS band after a change. The mobile station 300a then sends a band change request to the mobile station 200 which functions as a control station. Information indicative of the RS band after the change is added to the band change request. As a result, information registered in the relay station table 222 in the mobile station 200 is updated.

(Step S44) The mobile station 300a receives a confirmation response to the band change request sent in step S43 from the mobile station 200. The mobile station 300a then changes the currently used RS band to the RS band specified in step S43 and performs a relay process.

(Step S45) The mobile station 300a requires receiving power information from mobile stations under its control, that is to say, from mobile stations (mobile station 300, for example) which are connected thereto and which perform radio communication. By doing so, the mobile stations under its control measure the receiving power of signals received from surrounding base stations and relay stations. The mobile station 300a acquires receiving power information indicative of the results of measuring the receiving power from the mobile stations under its control.

(Step S46) The mobile station 300a checks on the basis of the receiving power information acquired in step S45 whether mobile stations which give better communication conditions as a relay station than the mobile station 300a are included among the mobile stations under its control. If the mobile station 300a detects mobile stations which give better communication conditions as a relay station than the mobile station 300a, then the mobile station 300a selects a candidate relay station from among the detected mobile stations.

For example, the mobile station 300a calculates the number of adjacent base stations and relay stations (that is to say, the number of base stations and relay stations which meet the condition that (receiving power)>(threshold Tr2)) for each of the mobile stations under its control. In addition, the mobile station 300a calculates receiving power in the currently used RS band (interference amount for each mobile station). The mobile station 300a then detects a mobile station of the mobile stations under its control for which the number of adjacent base stations and relay stations is larger than or equal to that of adjacent base stations and relay stations for the mobile station 300a and for which an interference amount is smaller than an interference amount for the mobile station 300a as a mobile station which gives better communication conditions as a relay station than the mobile station 300a. If the mobile station 300a detects a plurality of mobile stations, then the mobile station 300a selects, for example, a mobile station for which an interference amount is the smallest as a candidate relay station.

(Step S47) The mobile station 300a determines whether a mobile station which gives better communication conditions as a relay station than the mobile station 300a is detected in step S46. If a mobile station which gives better communication conditions as a relay station than the mobile station 300a is detected in step S46, step S48 is performed next. If a mobile station which gives better communication conditions as a relay station than the mobile station 300a is not detected in step S46, then the process terminates.

(Step S48) The mobile station 300a sends an RS switching request by which a change in relay station is required to the mobile station 200 which functions as a control station. An identification indicative of the candidate relay station selected in step S46 is added to the RS switching request. As a result, information registered in the relay station table 222 in the mobile station 200 is updated.

(Step S49) The mobile station 300a receives a confirmation response to the RS switching request sent in step S48 from the mobile station 200. The mobile station 300a then passes relay station control to a mobile station (mobile station 300, for example) which is the candidate relay station. That is to say, the mobile station 300a interrupts connection with the adjacent base stations or relay stations and stops a relay process. On the other hand, the mobile station 300 establishes connection with adjacent base stations or relay stations and begins a relay process.

Step S41 of the process is performed by a module corresponding to the measurement section 214. Steps S42 through S49 of the process are performed by a module corresponding to the control section 221.

As has been described, when a relay station detects another RS band in which an interference amount is smaller than an interference amount in a currently used RS band, the relay station changes an RS band to be used in order to control radio frequency interference between relay stations. In addition, when the relay station detects a second mobile station of mobile stations under its control which is more suitable for a relay station than the relay station, the relay station passes its function as a relay station to the second mobile station.

In step S46, both of the number of adjacent base stations and relay stations and an interference amount for each mobile station are used as communication conditions. However, only one of them may be used. For example, the mobile station 300a may detect a mobile station for which the number of adjacent base stations and relay stations is larger than that of adjacent base stations and relay stations for the mobile station 300a as a mobile station which gives better communication conditions as a relay station than the mobile station 300a. Furthermore, various other methods for defining communication conditions are possible. In step S46, the interference amount in the RS band currently used by the mobile station 300a is used as a communication condition. However, an interference amount in another RS band may be referred to.

Moreover, in order to narrow down the candidate relay stations in step S46, the mobile station 300a may refer to a remaining amount of a battery in or the speed of the movement of each mobile station under its control. That is to say, the mobile station 300a may preferentially select a mobile station in which a remaining amount of a battery is large or the speed of the movement of which is slow as a candidate relay station. In this case, the mobile station 300a may make each mobile station under its control report information regarding a remaining amount of a battery or the speed of movement estimated from fluctuations in receiving power in step S45.

Figure 14:
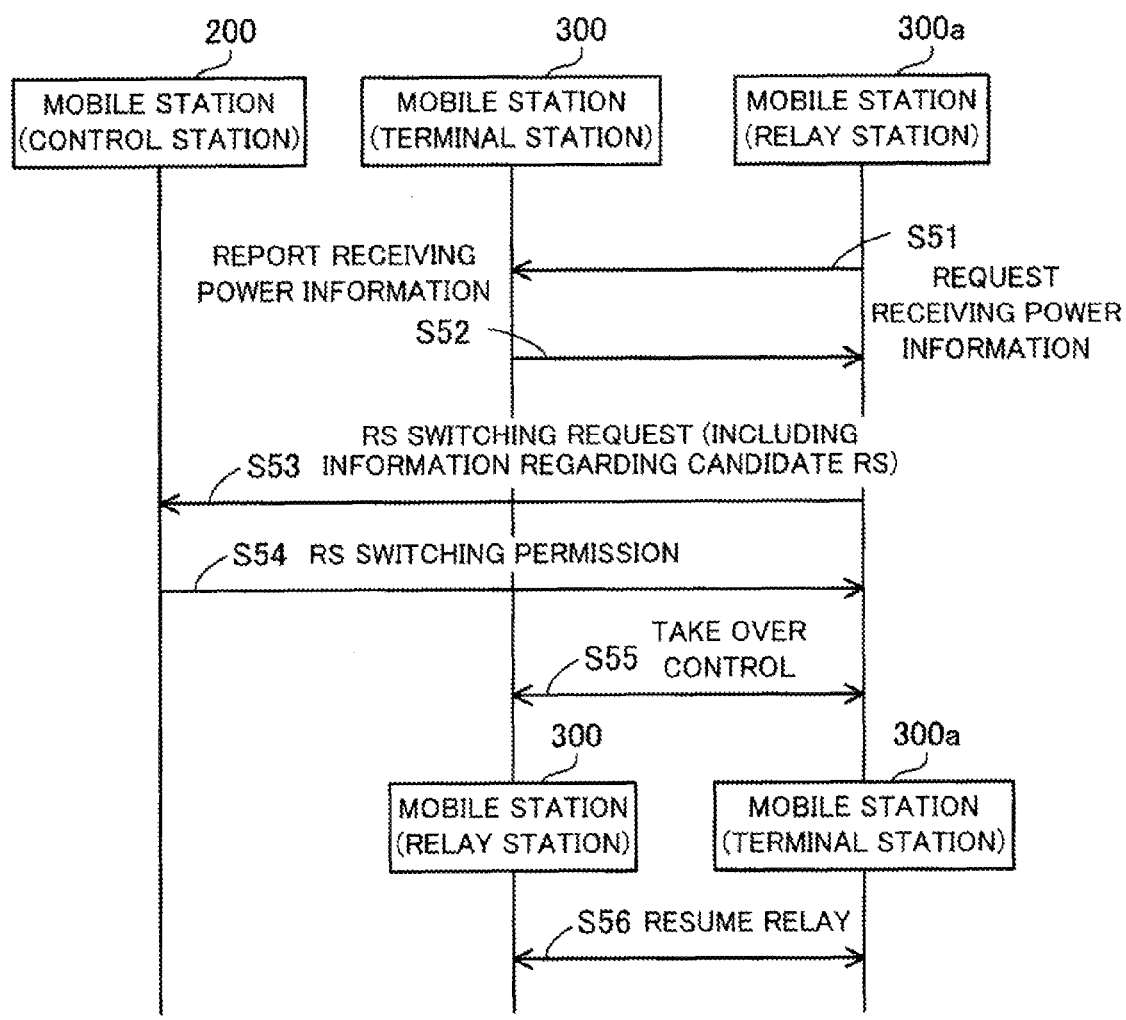
FIG. 14 is a sequence diagram of the flow of control exercised at the time of changing a relay station.

FIG. 14 is a sequence diagram of the flow of control exercised at the time of changing a relay station. An example of the flow of control messages illustrated in FIG. 14 will now be described in order of step number.

(Step S51) The mobile station 300a which functions as a relay station requests the mobile station 300 under its control which functions as a terminal station to send receiving power information. However, instead of sending a receiving power information request each time, the mobile station 300a may give the mobile station 300 instructions in advance to send receiving power information in a certain cycle.

(Step S52) The mobile station 300 measures the receiving power of signals received from surrounding base stations and relay stations. The mobile station 300 then sends receiving power information indicative of the results of measuring the receiving power to the mobile station 300a.

(Step S53) The mobile station 300a determines on the basis of the receiving power information acquired in step S52 that the mobile station 300 gives better communication conditions as a relay station than the mobile station 300a. The mobile station 300a then sends the mobile station 200 which functions as a control station an RS switching request indicative of a request to change a relay station. An identification of the mobile station 300 which is a new candidate relay station is added to the RS switching request.

(Step S54) The mobile station 200 updates information registered in the relay station table 222 on the basis of the RS switching request received in step S53. The mobile station 200 then sends the mobile station 300a notice of RS switching permission. In addition, the mobile station 200 informs the mobile stations 200a, 200b, and 200c (other relay stations) about a change in relay path caused by the change in relay station.

(Step S55) The mobile station 300 takes over the function as a relay station from the mobile station 300a. That is to say, the mobile station 300a interrupts connection with adjacent base stations or relay stations and stops a relay process. The mobile station 300 establishes connection with adjacent base stations or relay stations. As a result, the mobile station 300 begins operation as a relay station and the mobile station 300a begins operation as a terminal station.

(Step S56) The mobile station 300a which functions as a terminal station is connected to the mobile station 300 which functions as a relay station. By doing so, connection is established between the mobile stations 300 and 300a. The mobile station 300 relays user data and control information transmitted or received by the mobile station 300a.

Figure 15:
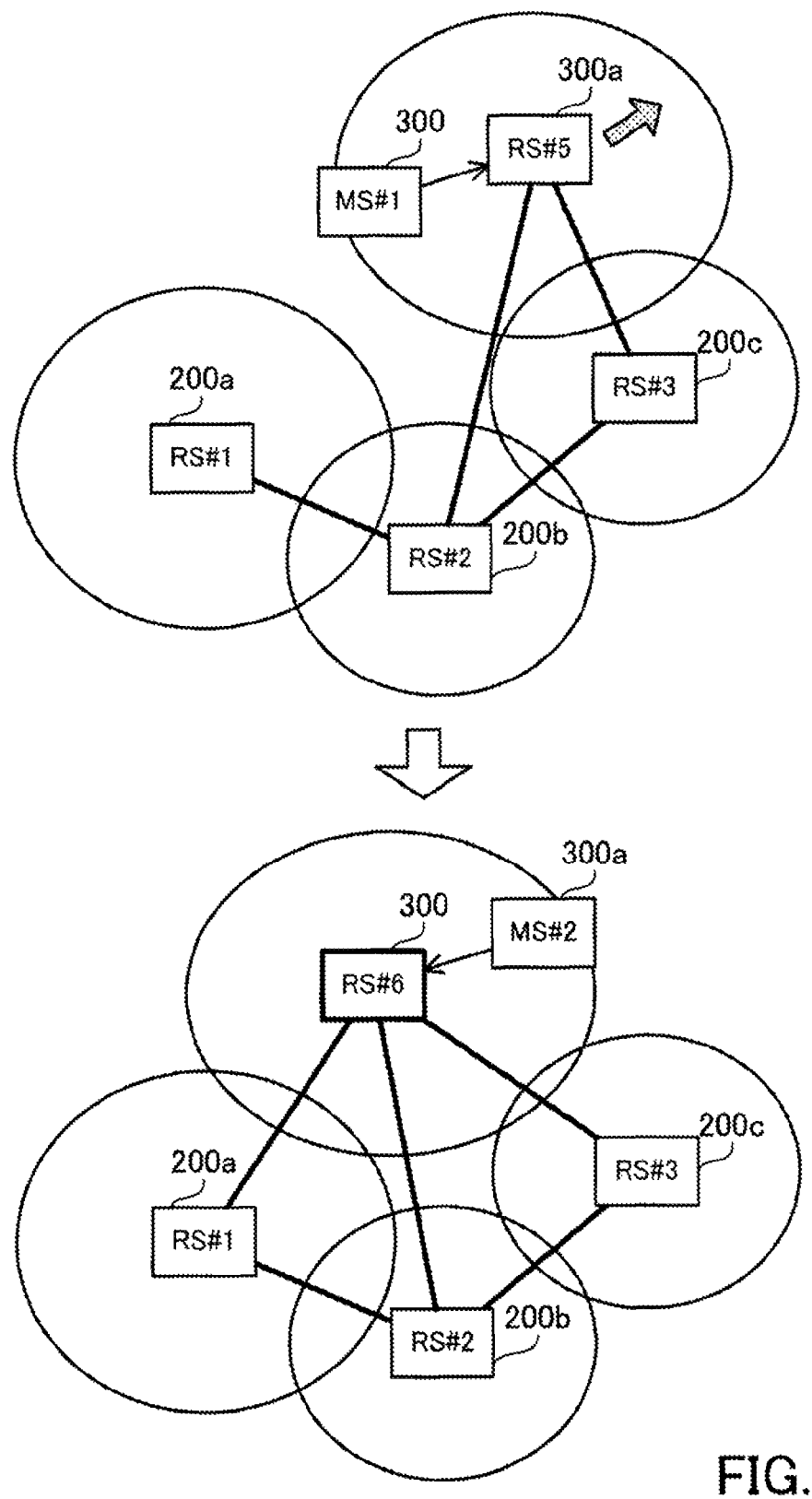
FIG. 15 illustrates a change in relay station and terminal station (part 2)

FIG. 15 illustrates a change in relay station and terminal station (part 2). As illustrated in FIG. 15, it is assumed that after the mobile station 300a is designated as a relay station, the mobile station 300a shifts so as to become more distant from the mobile station 200a. As a result, the receiving power of a signal which the mobile station 300a receives from the mobile station 200a becomes lower than or equal to the threshold Tr2. In addition, the number of relay stations adjacent to the mobile station 300 under the control of the mobile station 300a which functions as a terminal station becomes larger than that of relay stations adjacent to the mobile station 300a which functions as a relay station.

As a result, the mobile station 300a passes its function as a relay station to the mobile station 300 under its control. That is to say, the mobile station 300 begins operation as a relay station and establishes connection for relay with the adjacent mobile stations 200a, 200b, and 200c each of which functions as a relay station. In addition, the mobile station 300a begins operation as a terminal station, is connected to the mobile station 300 which functions as a relay station, and performs radio communication.

As has been described in the foregoing, the mobile station according to the second embodiment can function as a terminal station or a relay station. In addition, the mobile station which functions as a relay station can function as a control station.

Figure 16:
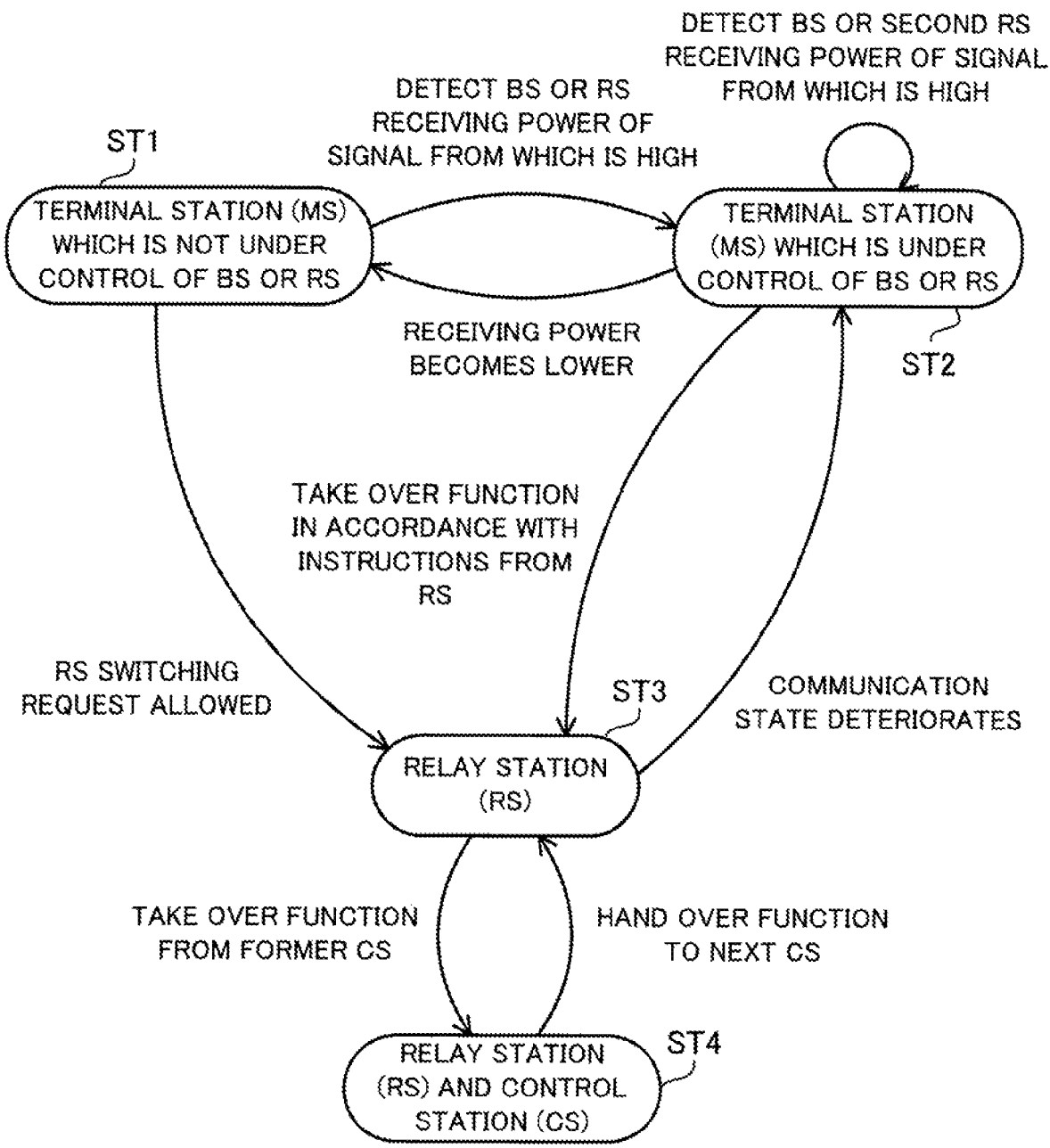
FIG. 16 illustrates transition of the state of a mobile station.

FIG. 16 illustrates transition of the state of a mobile station.

If a terminal station (state ST1) which is not under the control of a base station or a relay station detects a signal the receiving power of which is higher than the threshold Tr1, then the terminal station establishes connection with a base station or a relay station which transmits the signal and becomes a terminal station under the control of the base station or the relay station (makes the transition to a state ST2). Furthermore, if an RS switching request is allowed, the terminal station becomes a relay station (makes the transition to a state ST3).

If receiving power in the terminal station (state ST2) which is under the control of the base station or the relay station becomes lower than or equal to the threshold Tr1, then the terminal station becomes a terminal station which is not under the control of the base station or the relay station, and considers that it becomes a relay station (state ST1). If the terminal station detects a base station or a second relay station the receiving power of a signal from which is high, then the terminal station interrupts the above connection and establishes new connection with the base station or the second relay station. In addition, the terminal station may take over the function as a relay station in accordance with instructions from the relay station to which the terminal station is connected (makes the transition to the state ST3).

If a terminal station under the control of the relay station (state ST3) gives better communication conditions as a relay station than the relay station, then the relay station passes the function as a relay station to the terminal station. The relay station then becomes a terminal station under the control of the terminal station to which the function as a relay station is passed (makes the transition to the state ST2). In addition, the relay station may take over the function as a control station in accordance with instructions from a control station (makes the transition to a state ST4).

The control station (state ST4) makes the occurrence of a determined event (such as a change in communication state or the elapse of a certain period of time after beginning to function as a control station) an occasion to pass the function as a control station to another relay station (makes the transition to the state ST3).

According to the mobile communication system according to the above second embodiment, multihop relay communication can be performed by using a mobile station as a relay station. Therefore, a coverage area expands and communication quality improves. In addition, terminal stations which are distant from base stations and existing relay stations are classified into areas and a new relay station is designated in each area. As a result, a plurality of terminal stations are grouped properly and an efficient relay network is built.

Furthermore, an interference amount is measured in each area and a band in which an interference amount is small is used for relay communication. As a result, a deterioration in communication quality caused by radio frequency interference between relay stations can be controlled. Moreover, if a mobile station which functions as a relay station shifts and interference conditions change, a band used is changed in order to control interference. In addition, if one of terminal stations under the control of a relay station is in a more desirable communication environment than the relay station, then a functional exchange is made between the relay station and the terminal station under its control. By doing so, the influence of a change in communication environment caused by shifting can be controlled.

By adopting the above communication control apparatus, mobile terminal apparatus, and radio communication method, a radio communication apparatus which functions as a relay station can be selected properly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions, and alterations could be made hereto without departing from the spirit and scope of the invention.

What is claimed is:

1. A communication control apparatus used in a mobile communication system including a radio communication apparatus which functions as a base station or a relay station and a plurality of mobile terminal apparatuses connected to the radio communication apparatus for performing radio communication, the communication control apparatus comprising:

a receiving section which acquires, from each of at least part of the mobile terminal apparatuses, information indicative of receiving power or receiving duality of a signal received from the radio communication apparatus, the receiving power or the receiving quality being measured by said each of at least part of the mobile terminal apparatuses; and a control section which detects more than one mobile terminal apparatus in which the receiving power or the receiving quality is lower than or equal to a first threshold and higher than a second threshold being lower than the first threshold, and designates a mobile terminal apparatus to function as a relay station for relaying communication between the radio communication apparatus and a mobile terminal apparatus which does not function as a relay station from among the detected more than one mobile terminal apparatus on the basis of the acquired information indicative of the receiving power or the receiving quality.

2. A communication control apparatus used in a mobile communication system including a radio communication apparatus which functions as a base station or a relay station and a plurality of mobile terminal apparatuses connected to the radio communication apparatus for performing radio communication, the communication control apparatus comprising:

a receiving section which acquires, from a mobile terminal apparatus in which receiving power or receiving quality of a signal received from the radio communication apparatus is lower than or equal to a determined threshold, information indicative of the receiving power or the receiving quality measured by the mobile terminal apparatus; and a control section which designates, once more than one mobile terminal apparatus in which the receiving power or the receiving quality is lower than or equal to the determined threshold is detected, a mobile terminal apparatus to function as a relay station for relaying communication between the radio communication apparatus and a mobile terminal apparatus which does not function as a relay station from among the detected more than one mobile terminal apparatus on the basis of the acquired information indicative of the receiving power or the receiving quality, wherein the control section:

classifies the more than one mobile terminal apparatus detected into one or more groups on the basis of the acquired information indicative of the receiving power or the receiving quality; and designates a mobile terminal apparatus in each group to function as a relay station.

3. The communication control apparatus according to claim 1, wherein:

the radio communication apparatus which functions as a relay station relays communication by the use of one of a plurality of frequency bands; and the control section designates a frequency band to be used by the mobile terminal apparatus made to function as the relay station from among the plurality of frequency bands on the basis of the acquired information indicative of the receiving power or the receiving quality.

4. A communication control apparatus used in a mobile communication system including a radio communication apparatus which functions as a base station or a relay station and a plurality of mobile terminal apparatuses connected to the radio communication apparatus for performing radio communication, the communication control apparatus comprising:

a receiving section which acquires, from a mobile terminal apparatus in which receiving power or receiving quality of a signal received from the radio communication apparatus is lower than or equal to a determined threshold, information indicative of the receiving power or the receiving quality measured by the mobile terminal apparatus; and a control section which designates, once more than one mobile terminal apparatus in which the receiving power or the receiving quality is lower than or equal to the determined threshold is detected, a mobile terminal apparatus to function as a relay station for relaying communication between the radio communication apparatus and a mobile terminal apparatus which does not function as a relay station from among the detected more than one mobile terminal apparatus on the basis of the acquired information indicative of the receiving power or the receiving quality, wherein:

the mobile communication system includes a plurality of radio communication apparatuses each functioning as a relay station; and the control section totalizes the receiving power or the receiving quality measured by the more than one mobile terminal apparatus detected in each frequency band and designates a frequency band to be used by the mobile terminal apparatus made to function as the relay station on the basis of totalization results.

5. The communication control apparatus according to claim 1, wherein:

the mobile communication system includes a plurality of radio communication apparatuses each functioning as a relay station; and the control section specifies a radio communication apparatus which transmits a signal the receiving power or the receiving quality of which is higher than the second threshold for each of the detected more than one mobile terminal apparatus, and designates a mobile terminal apparatus for which a number of radio communication apparatus specified is the largest as the relay station.

6. A communication control apparatus used in a mobile communication system including a radio communication apparatus which functions as a base station or a relay station and a plurality of mobile terminal apparatuses connected to the radio communication apparatus for performing radio communication, the communication control apparatus comprising:

a receiving section which acquires, from a mobile terminal apparatus in which receiving power or receiving quality of a signal received from the radio communication apparatus is lower than or equal to a determined threshold, information indicative of the receiving power or the receiving quality measured by the mobile terminal apparatus; and a control section which designates, once more than one mobile terminal apparatus in which the receiving power or the receiving quality is lower than or equal to the determined threshold is detected, a mobile terminal apparatus to function as a relay station for relaying communication between the radio communication apparatus and a mobile terminal apparatus which does not function as a relay station from among the detected more than one mobile terminal apparatus on the basis of the acquired information indicative of the receiving power or the receiving quality, wherein:

the mobile communication system includes a plurality of radio communication apparatuses each functioning as a relay station and using one of a plurality of frequency bands for relaying communication; and the control section totalizes the receiving power or the receiving quality measured by the detected more than one mobile terminal apparatus in each frequency band, specifies a frequency band in which a total of the receiving power or the receiving quality is the smallest, and designates a mobile terminal apparatus to function as the relay station on the basis of the specified frequency band and the acquired information indicative of the receiving power or the receiving quality.

7. The communication control apparatus according to claim 1, wherein:

the mobile communication system includes a plurality of radio communication apparatuses each functioning as a relay station; and the control section specifies a radio communication apparatus which transmits a signal the receiving power or the receiving quality of which is higher than the second threshold and sets a relay path between the mobile terminal apparatus made to function as the relay station and the specified radio communication apparatus, the receiving power or the receiving quality of the signal being measured by the mobile terminal apparatus made to function as the relay station.

8. The communication control apparatus according to claim 1, wherein the communication control apparatus is a communication apparatus which functions as a base station, a relay station, or an upper station for controlling the base station.

9. A mobile terminal apparatus which is connected to a radio communication apparatus that functions as a base station or a relay station and which performs radio communication, the mobile terminal apparatus comprising:

a measurement section which measures receiving power or receiving quality of a signal received from the radio communication apparatus; and a control section which determines whether the receiving power or the receiving quality is lower than or equal to a first threshold and higher than a second threshold being lower than the first threshold and exercises control, in the case of the receiving power or the receiving quality being lower than or equal to the first threshold and higher than the second threshold, so as to send a communication control apparatus a request to make the mobile terminal apparatus a relay station and so as to function as a relay station for relaying communication between the radio communication apparatus and a second mobile terminal apparatus which does not function as a relay station on the basis of a response to the request received from the communication control apparatus.

10. The mobile terminal apparatus according to claim 9, further comprising a receiving section which acquires information indicative of the receiving power or the receiving quality measured by the second mobile terminal apparatus connected to the mobile terminal apparatus from the second mobile terminal apparatus after beginning of operation of the mobile terminal apparatus as a relay station, wherein the control section sends the communication control apparatus a request that the mobile terminal apparatus hands over a function as a relay station to the second mobile terminal apparatus on the basis of a result of the measurement by the measurement section and the information acquired by the receiving section.

11. The mobile terminal apparatus according to claim 9, wherein:

a frequency band is designated in the response received from the communication control apparatus; and the control section exercises control so as to relay communication by the use of the designated frequency band.

12. The mobile terminal apparatus according to claim 9, wherein:

the radio communication apparatus which functions as a relay station relays communication by the use of one of a plurality of frequency bands; and the control section changes a frequency band used for relaying communication after beginning of operation of the mobile terminal apparatus as a relay station on the basis of the receiving power or the receiving quality measured by the measurement section.

13. A radio communication method for a mobile communication system including a radio communication apparatus which functions as a base station or a relay station and a plurality of mobile terminal apparatuses connected to the radio communication apparatus for performing radio communication, the method comprising:

measuring, by each of the plurality of mobile terminal apparatuses, receiving power or receiving quality of a signal received from the radio communication apparatus;

detecting more than one mobile terminal apparatus in which the receiving power or the receiving quality is lower than or equal to a first threshold and higher than a second threshold being lower than the first threshold, and selecting a mobile terminal apparatus to be made to function as a relay station from among the detected more than one mobile terminal apparatus on the basis of a result of measuring the receiving power or the receiving quality; and relaying, by the mobile terminal apparatus selected as a relay station, communication between the radio communication apparatus and a mobile terminal apparatus which does not function as a relay station.

* * * * *